US012762009B2

(12) United States Patent
Liu et al.

(10) Patent No.: US 12,762,009 B2
(45) Date of Patent: Oct. 13, 2026

(54) DATA PROCESSING METHOD BASED ON BLOCKCHAIN NETWORK AND RELATED PRODUCT

(71) Applicant: TENCENT TECHNOLOGY (SHENZHEN) COMPANY LIMITED, Shenzhen (CN)

(72) Inventors: Hanqing Liu, Shenzhen (CN); Zongyou Wang, Shenzhen (CN); Hu Lan, Shenzhen (CN); Gengliang Zhu, Shenzhen (CN); Yifang Shi, Shenzhen (CN); Zhiyong Liao, Shenzhen (CN); Jinsong Zhang, Shenzhen (CN); Qucheng Liu, Shenzhen (CN); Yingjie Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 104 days.

(21) Appl. No.: 18/814,021

(22) Filed: Aug. 23, 2024

(65) Prior Publication Data

US 2024/0419537 A1 Dec. 19, 2024

Related U.S. Application Data

(63) Continuation of application No. PCT/CN2023/091997, filed on May 4, 2023.

(30) Foreign Application Priority Data

May 19, 2022 (CN) ......................... 202210545459.4

(51) Int. Cl.

| | |
|---|---|
| ***G06F 11/00*** | (2006.01) |
| ***G06F 11/10*** | (2006.01) |
| ***G06F 11/1446*** | (2026.01) |

(52) U.S. Cl.
CPC ...... *G06F 11/1004* (2013.01); *G06F 11/1464* (2013.01)

(58) Field of Classification Search
CPC ......................... G06F 11/1004; G06F 11/1464
See application file for complete search history.

(56) References Cited

U.S. PATENT DOCUMENTS

2021/0119805 A1* 4/2021 Zhuo .................... H04L 9/3239
2023/0087138 A1 3/2023 Li et al.
2023/0316273 A1 10/2023 Zhu et al.

FOREIGN PATENT DOCUMENTS

CN 111444211 A 7/2020
CN 113190622 A 7/2021
(Continued)

OTHER PUBLICATIONS

W. Liang, Y. Fan, K.-C. Li, D. Zhang and J.-L. Gaudiot, "Secure Data Storage and Recovery in Industrial Blockchain Network Environments," in IEEE Transactions on Industrial Informatics, vol. 16, No. 10, pp. 6543-6552, Oct. 2020. (Year: 2020).*
(Continued)

*Primary Examiner* — Philip Guyton
(74) *Attorney, Agent, or Firm* — Anova Law Group, PLLC

(57) ABSTRACT

Embodiments of the present application provide a data processing method based on a blockchain network and a related product. The method includes obtaining the check block from the service node in the witness network; determining a data recovery reference matrix based on a coding matrix and the check block obtained from the service node in the witness network; and recovering the target block based on the data recovery reference matrix and the check block obtained from the service node in the witness network. The target block is a block on a blockchain maintained by the consensus node in the consensus network. The check
(Continued)

block of the target block stored by the service node is obtained by the service node when synchronizing related block data of the target block from the consensus node in the consensus network and the check block is configured for recovering the target block.

20 Claims, 8 Drawing Sheets

(56) References Cited

FOREIGN PATENT DOCUMENTS

| | | | |
|---|---|---|---|
| CN | 113254272 | A | 8/2021 |
| CN | 113421097 | A | 9/2021 |
| WO | 2019147295 | A1 | 8/2019 |

OTHER PUBLICATIONS

The World Intellectual Property Organization (WIPO) International Search Report for PCT/CN2023/091997 Jun. 20, 2023 5 Pages (including translation).

* cited by examiner

DATA PROCESSING METHOD BASED ON BLOCKCHAIN NETWORK AND RELATED PRODUCT

RELATED APPLICATIONS

This application is a continuation of PCT Application No. PCT/CN2023/091997, filed on May 4, 2023, which in turn claims priority to Chinese Patent Application No. 202210545459.4, entitled "DATA PROCESSING METHOD BASED ON BLOCKCHAIN NETWORK AND RELATED PRODUCT" and filed with the China National Intellectual Property Administration on May 19, 2022. The two applications are incorporated herein by reference in their entirety.

FIELD OF THE TECHNOLOGY

The present application relates to the field of blockchain technologies, and in particular, to a data processing method based on a blockchain network, a data processing apparatus, a computer device, a computer-readable storage medium, and a computer program product.

BACKGROUND OF THE DISCLOSURE

With the advent of the technological era and the development of the mobile Internet, the pace of network transformation is becoming faster and faster. The process of implementing information integration in the same field or multiple fields and providing customers with comprehensive information solutions also faces new challenges such as system structure improvement and support focus shift. Therefore, blockchain technology, as a specific implementation of distributed ledgers, has gradually become a preferred way to store and transact data in various fields due to natural advantages in storing and managing data.

A blockchain is the basis of the blockchain technology. A blockchain is essentially a decentralized database and is a series of data blocks generated using cryptographic methods. Each data block contains information about a batch of network transactions, where the information is configured for verifying the validity of information thereof (anti-counterfeiting) and generating a next block. The blockchain is usually maintained by a consensus node in the blockchain network, but block data of the blockchain maintained by the consensus node may be lost due to factors such as storage space (such as hard disk) damage. In this case, the consensus node usually needs to recover the block data to improve the integrity of the maintained blockchain. How to complete the recovery of the block data is currently the focus of research.

SUMMARY

Embodiments of the present application provide a data processing method based on a blockchain network and a related product, which can successfully recover a block and can effectively improve the availability of the recovered block.

One aspect of the embodiments of the present application provides a data processing method based on a blockchain network, the blockchain network including a witness network and a consensus network, the witness network being formed by networking of multiple service nodes, the consensus network being formed by networking of multiple consensus nodes, and the witness network and the consensus network establishing a communication connection. The method includes when determining that a target block needs to be recovered based on a check block of the target block, obtaining the check block from the service node in the witness network; determining a data recovery reference matrix based on a coding matrix and the check block obtained from the service node in the witness network; and recovering the target block based on the data recovery reference matrix and the check block obtained from the service node in the witness network. The target block is a block on a blockchain maintained by the consensus node in the consensus network; the check block of the target block stored by the service node is obtained by the service node when synchronizing related block data of the target block from the consensus node in the consensus network; the check block is obtained by the consensus node in the consensus network by encoding the target block using the coding matrix; and the check block is configured for recovering the target block.

Another aspect of the embodiments of the present application provides another data processing method based on a blockchain network, the blockchain network including a witness network and a consensus network, the witness network being formed by networking of multiple service nodes, the consensus network being formed by networking of multiple consensus nodes, and the witness network and the consensus network establishing a communication connection. The method includes transmitting a block synchronization request to the consensus node in the consensus network, the block synchronization request carrying a synchronization block height and a node identifier of the target service node, the synchronization block height being a block height of a target block that needs to be synchronized, and the target block being a block on a blockchain maintained by the consensus node in the consensus network, and the block synchronization request requesting the consensus node to return related data of the target block; receiving the related data of the target block returned by the consensus node, the related data comprising a block header of the target block, transaction data that is comprised in the target block accessible by the target service node, and a matching check block that is of K check blocks corresponding to the target block and that matches the node identifier, the K check blocks being obtained by encoding the target block using a coding matrix, and K being a positive integer greater than 1; and storing the related data of the target block, the stored matching check block being used by the consensus node in the consensus network to recover the target block.

Another aspect of the embodiments of the present application provide a computer device, including: a processor, a communication interface, and a memory, the processor, the communication interface, and the memory being connected to each other, the memory storing executable program code, the processor being configured to call the executable program code to implement the data processing method based on a blockchain network provided by the embodiments of the present application.

In the embodiments of the present application, the consensus node generates the check block of the block, when the service node synchronizes the block, synchronizes the check block of the block and the related block data of the block to the service node, and when the consensus node needs to recover the block, obtains, from the service node, the check block of the block that needs to be recovered, and can successfully recover the block based on the obtained check block. Accordingly, when the consensus network is unavailable and the block cannot be recovered based on the block data stored by the service node, the block can be successfully recovered based on the check block stored by the service node. This can effectively improve the availability of the recovered block.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments of the present application, and a person of ordinary skill in the art may still derive other drawings from the accompanying drawings without creative efforts.

DESCRIPTION OF EMBODIMENTS

Figure 1A:
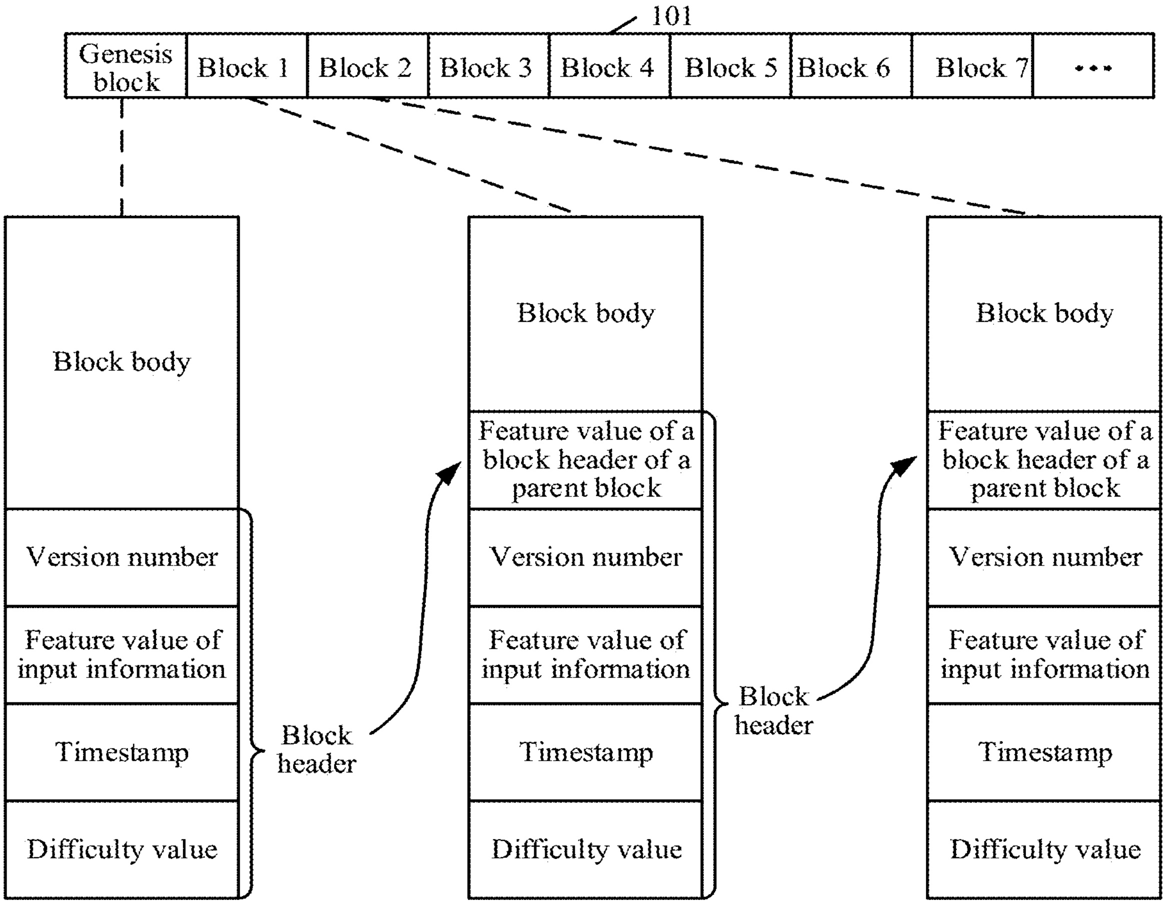
FIG. 1*a* is a schematic structural diagram of a blockchain according to one embodiment of the present application.

The technical solutions in embodiments of the present application are clearly and completely described in the following with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

For ease of understanding of the embodiments of the present application, terminologies and blockchain technologies in the embodiments of the present application are described below first.

Consensus node: A consensus node in a blockchain network is responsible for generating blocks. In addition to packaging a batch of transactions and executing transactions, the consensus node is also responsible for reaching consensus with other consensus nodes to update a chain status. The consensus node owns a full amount of blockchain data.

Clearing: An upper-level node synchronizes transactions with a lower-level node based on permission of the lower-level node.

Service node: The service node is a lightweight node in a blockchain network. The service node is responsible for processing a service request and transparently transmitting the service request to the consensus node. The service node synchronizes all block headers and only synchronizes transaction data that is visible to (that is, can be accessed by) the node. The service node initiates a synchronization request to the consensus node or an upper-level node of the service node, and the consensus node or the upper-level node clears the block header and transaction data visible to the service node to the service node.

Merkle tree and Merkle tree root: Merkle tree is a typical binary tree structure and includes a root node (the Merkle tree root), a set of intermediate nodes, and a set of leaf nodes. A leaf node at the lowest level stores data or its hash value, and the other nodes store hash values of contents of two child nodes of the leaf node.

Pbft consensus algorithm (that is, a consensus algorithm based on a practical Byzantine fault tolerance algorithm): It is a consensus algorithm based on message transfer. The algorithm reaches agreement through three stages. When there are f Byzantine fault nodes, if the total number of nodes is greater than or equal to 3f+1, all nodes can still reach final agreement (that is, consensus can be completed). On the contrary, if the total number of nodes is less than 3f+1, all nodes cannot reach final agreement (that is, consensus cannot be completed).

Erasure code: An erasure code technology mainly encodes original data to obtain redundancy through an erasure code algorithm, and stores the data and redundancy together to achieve the purpose of fault tolerance. The basic idea is to obtain m blocks of redundant elements (check blocks) from n blocks of original data elements through calculations. For these n+m blocks of elements, when any m blocks of elements have an error (including original data and redundant data), the original n blocks of data can be recovered through the corresponding reconstruction algorithm.

The embodiments of the present application involve blockchain technology, and a blockchain is the basis of the blockchain technology. The blockchain is a new application model of computer technologies such as distributed data storage, point-to-point transmission, consensus mechanism, and encryption algorithm. A blockchain is essentially a decentralized database and is a string of data blocks associated with cryptographic methods. Each data block includes a batch of network transaction information and is used to verify the validity of information thereof (anti-counterfeiting) and generate a next block. A schematic structural diagram of a blockchain may be seen in FIG. 1*a*. As shown in FIG. 1*a*, blockchain 101 includes multiple blocks. The first block of the blockchain is called a genesis block (which may be referred to as a genesis block for short), and the genesis block includes a block header and a block body. The block header stores a feature value of input information, a version number, a timestamp, and a difficulty value, and the block body stores input information (including transaction data). The next block of the genesis block uses the genesis block as a parent block. The next block also includes a block header and a block body. The block header stores a feature value of input information of the current block, a feature value of a block header of the parent block, a version number, a timestamp, a difficulty value, and so on, so that the block data stored in each block in the blockchain is related to the block data stored in the parent block, ensuring security of input information in the block.

Figure 1B:
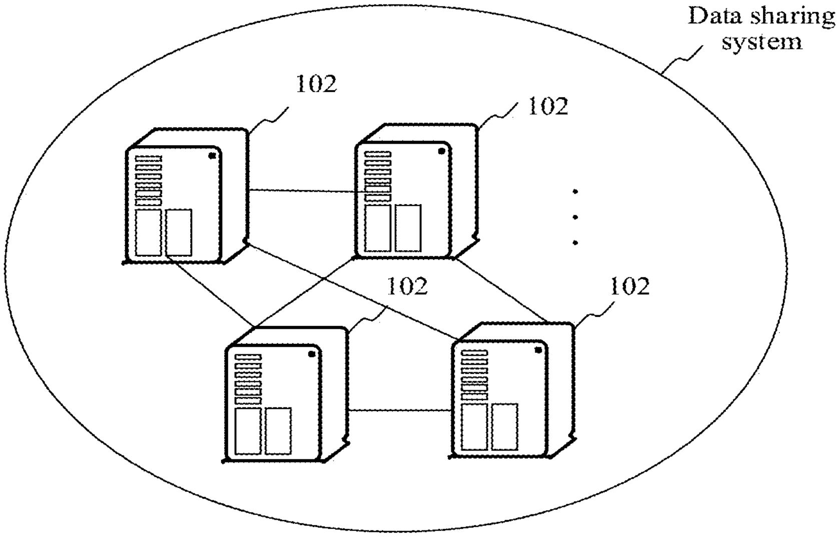
FIG. 1*b* is a schematic architectural diagram of a data sharing system according to one embodiment of the present application.

The blockchain may be maintained by a blockchain node included in the blockchain network. The blockchain network may be understood as a data sharing system, which refers to a system for data sharing between blockchain nodes. One structure of the data sharing system may be seen in FIG. 1*b*. As shown in FIG. 1*b*, the data sharing system may include multiple blockchain nodes 102. Each blockchain node 102 may be a server connected to the blockchain network or a terminal device (such as a client) connected to the blockchain network. The specific form of the blockchain node 102 is not limited herein. Each blockchain node 102 in the blockchain network has a corresponding node identifier. Each blockchain node 102 in the blockchain network may store a node identifier of another blockchain node 102 in the blockchain network, to subsequently broadcast a generated block to another blockchain node 102 in the data sharing system based on the node identifier of another blockchain node 102. A node identifier list may be maintained in each blockchain node 102, and a node name and a node identifier are correspondingly stored in the node identifier list. The node identifier list may be seen in Table 1:

TABLE 1

| Node name | Node identifier |
|---|---|
| Node 1 | 117.114.151.174 |
| Node 2 | 117.116.189.145 |
| . . . | . . . |
| Node X<br>(X is a positive integer) | xx.xxx.xxx.xxx |

As shown in Table 1, the node identifier may be an internet protocol (IP) address or any other type of information capable of identifying the node. For example, the node identifier may also be a binary sequence code (such as 110001110). Table 1 only uses the IP address as an example for description. When a to-be-verified block is generated in the blockchain network, a blockchain node (or a consensus node) running the consensus mechanism in the blockchain network reaches consensus on the to-be-verified block, and after the consensus succeeds, the to-be-verified block is synchronized to each blockchain node in the blockchain network based on the node identifier in the node identifier list, to achieve distributed storage of data in the blockchain network.

The blockchain network shown in FIG. 1*b* is a single-layer blockchain network, that is, nodes are peer-to-peer and are in the same network. However, when the blockchain network is used in some application scenarios such as government or commercial institutions, not all blockchain participating nodes have sufficient resources and necessity to become nodes participating in the blockchain consensus. In consideration of data security, when confidential data is involved in the blockchain system, it is inappropriate to use a blockchain deployment method featuring common data peer-to-peer. It can be seen that a single-layer (that is, node peer-to-peer) blockchain network is inapplicable to the above multiple application scenarios.

Figure 2A:
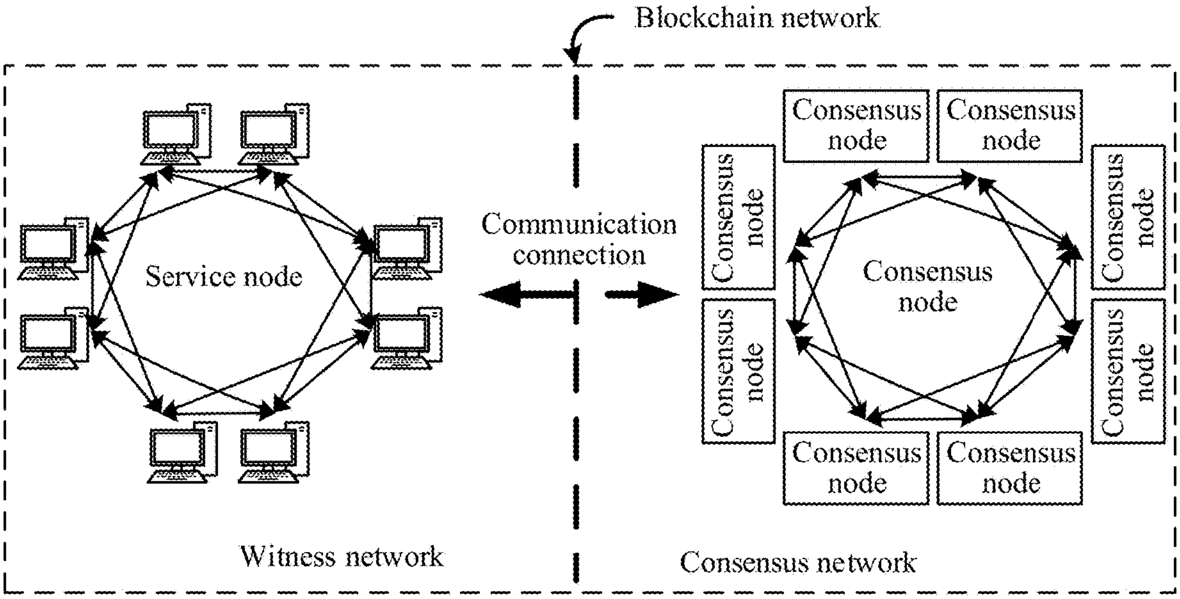
FIG. 2*a* is a schematic architectural diagram of a hierarchical blockchain network according to one embodiment of the present application.

In order to solve the above problem, the embodiments of the present application provide a hierarchical blockchain network. As shown in FIG. 2*a*, the blockchain network is divided into two layers: a witness network and a consensus network, the witness network being formed by networking of multiple service nodes, the consensus network being formed by networking of multiple consensus nodes, and the witness network and the consensus network establishing a communication connection. The service nodes in the witness network are lightweight nodes, and the consensus nodes in the consensus network are full-weight nodes. Consensus nodes participate in block generation (that is, block generating) and consensus in the consensus network, and each consensus node has a full amount of blockchain data, or in other words, stores block data of all blocks on the blockchain. The service node executes service logic in the witness network, submits service operations to the consensus network, and synchronizes block data from the consensus node (synchronizes all block headers and only synchronizes transaction data visible to (that is, can be accessed by) the node), or the like. The witness network and the consensus network are in different network environments. The witness network is usually in a public network, and a service node may join/exit relatively freely. A consensus network is usually deployed in a relatively secure and closed private network, and the joining/exiting of a consensus node requires the consensus of the consensus committee (or all consensus nodes in the consensus network).

Figure 2B:
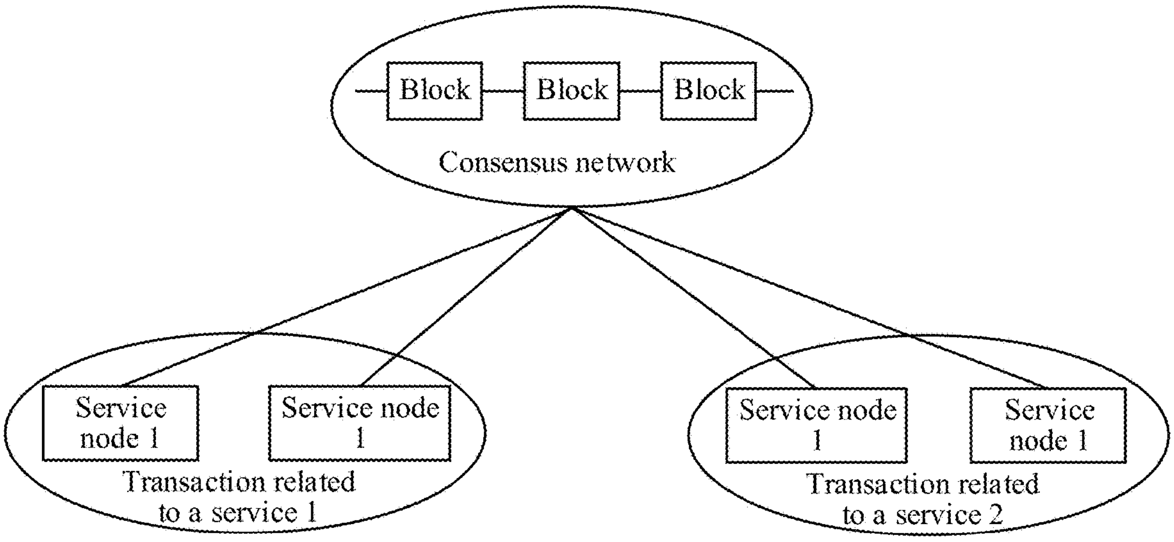
FIG. 2*b* shows isolation between transaction data of different services in the hierarchical blockchain network shown in FIG. 2*a;*

The hierarchical blockchain network shown in FIG. 2*a* is a system of consensus nodes+service nodes, which can achieve isolation between transaction data of different services, as shown in FIG. 2*b*. In addition, in addition to storing a full amount of transaction data in the consensus network, the consensus node also clears service-related transaction data to service nodes according to permission of the service nodes. The design of this hierarchical blockchain meets requirements for transaction confidentiality in the industry and also enhances the availability of blockchain data to a certain extent. Even if the consensus network data is untrustworthy/unavailable, historical transaction data stored on the service node may still be queried.

By dividing the blockchain network into a witness network and a consensus network, nodes in the blockchain network may be distinguished according to different functions (divided into consensus nodes and service nodes). On the one hand, a hierarchical blockchain network may be achieved, and only some nodes in the blockchain network need to be used as consensus nodes, which helps improve consensus efficiency. On the other hand, nodes in different networks may store different data and implement a blockchain deployment method not featuring data asymmetry, which can improve data security and confidentiality. Based on the above advantages, the hierarchical blockchain network can be applied to application scenarios to which a single-layer blockchain network is inapplicable.

For the hierarchical blockchain network shown in FIG. 2*a*, when a consensus node A (any consensus node in the consensus network) needs to recover a block B (any block on the blockchain) because of block data (such as transaction data) loss of the block B caused by factors such as storage space (such as hard disk) damage, or when a node C newly joins the consensus network and becomes a consensus node and needs to synchronize all block data (hereinafter, synchronizing the block B is used as an example for description and other blocks are similar), if the consensus nodes in the consensus network can reach consensus at this time, the consensus node A or the consensus node C can directly synchronize, from other consensus nodes in the consensus network, the block B that can pass consensus.

In a consensus network with 3f+1 consensus nodes, where f is a positive integer greater than or equal to 1, taking f=1 as an example, if two or more consensus nodes cannot participate in (or complete) the consensus because of related data loss or disconnection, since the proportion of nodes that can participate in the consensus cannot exceed a set proportion (such as ½), consensus cannot be reached, and in this case, the consensus network is unavailable. If the consensus nodes in the consensus network cannot reach consensus, the correctness (or availability) of the block B stored by other consensus nodes cannot be determined, and the block B cannot be synchronized directly from other consensus nodes. Since the service nodes in the witness network may store the block data of block B, the consensus node A or the consensus node C may try to obtain all the block data of the block B from the service nodes in the witness network. If all the block data of the block B may be obtained from the service node of the witness network, the block B may be directly recovered based on all the obtained block data of the block B. If the consensus node A or the consensus node C cannot obtain all the block data of the block B from the service nodes in the witness network because of factors, for example, the service nodes in the witness network cannot synchronize all block data of the block B (for example, the transaction data in the block B is visible to none of the service nodes, and consequently the service nodes can only synchronize a block header of the block B), or the service node that has originally synchronized the block data of the block B exits from the blockchain network and consequently other service nodes fail to include all the block data of the block B, the consensus node A or the consensus node C cannot obtain the block B.

Accordingly, the embodiments of the present application provide a block recovery solution to successfully recover the block even if the consensus network is unavailable (that is, the consensus nodes in the consensus network cannot reach consensus) and the block cannot be recovered based on block data stored by the service nodes in the witness network. The availability (or accuracy) of the recovered block can be effectively improved.

Figure 3A:
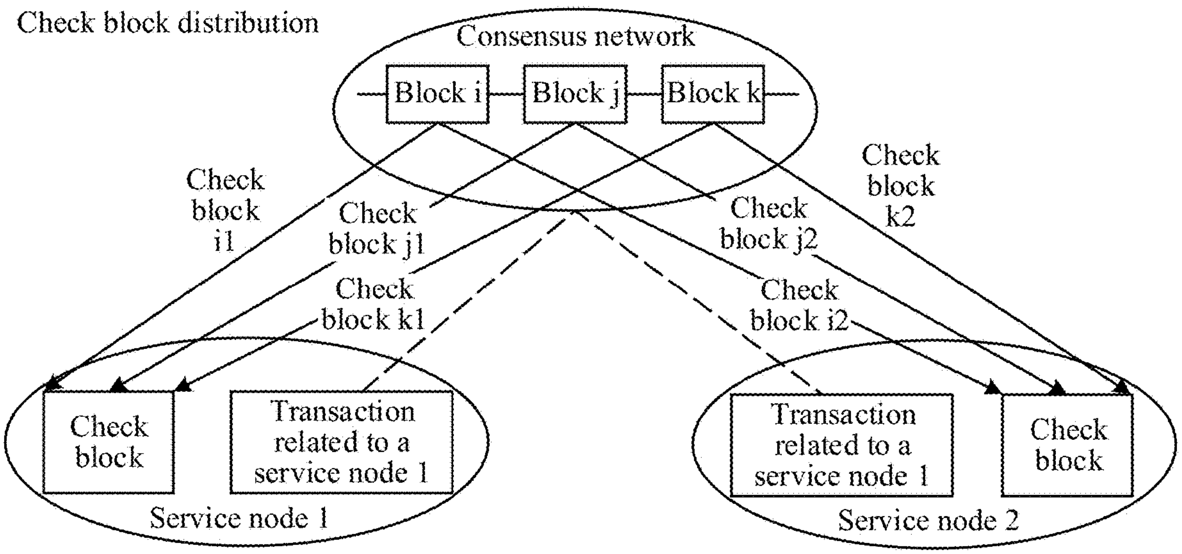
FIG. 3*a* shows a distribution process of a check block according to one embodiment of the present application.
Figure 3B:
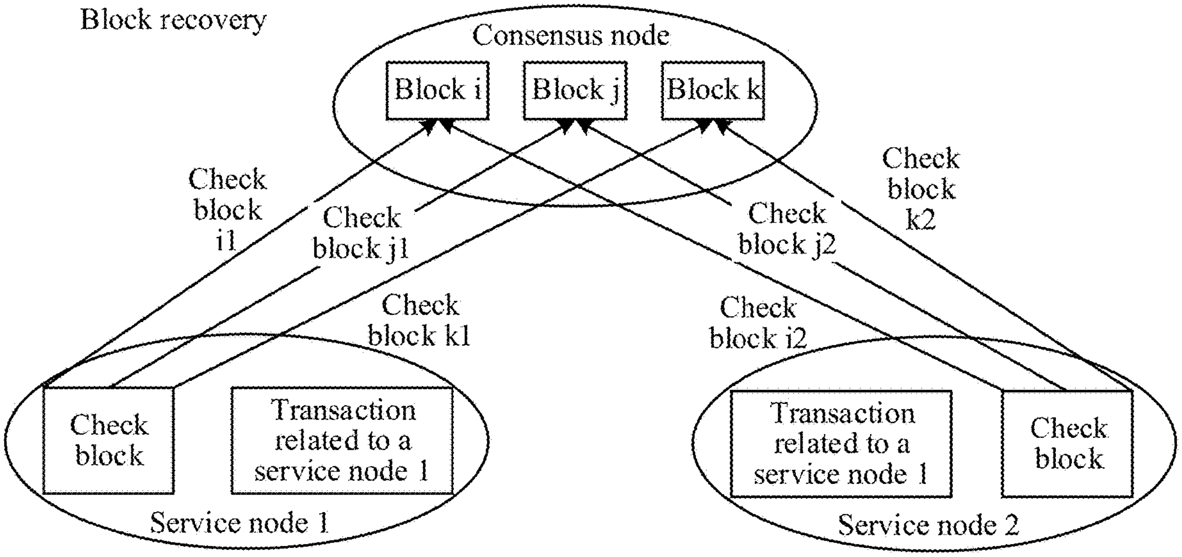
FIG. 3*b* shows a check recovery process according to one embodiment of the present application.

The block recovery solution provided by the embodiments of the present application mainly includes a check block distribution process as shown in FIG. 3*a* and a block recovery process based on a check block as shown in FIG. 3*b*. The consensus node generates the check block of each block on the blockchain. When normally synchronizing the block data from the consensus node, in addition to synchronizing transaction data related to the service node in a block and a block header, the service node needs to additionally synchronize a check block of this block. When the consensus node needs to recover a block based on a check block, the consensus node requests the check block from the service node, and after collecting a sufficient number of check blocks, can successfully recover block data of the block based on the obtained check blocks.

The block recovery solution provided by the embodiments of the present application is described with reference to the above example of recovering block B. The main processing process is as follows: After putting block B on the chain, each consensus node in the consensus network uses the coding matrix to encode the block B to obtain K check blocks of the block B. K is a positive integer greater than 1. The K check blocks are configured for recovering the block B. Then, all or a part of the K check blocks are stored. When a block synchronization request about the block B sent by the service node in the witness network is received, the block header of the block B and the transaction data that is included in the block B and that can be accessed by the service node are obtained, and a matching check block that is of the K check blocks of the block B and that matches the node identifier of the service node is obtained. Then, the block header of block B, the transaction data that is included in the block B and that can be accessed by the service node, and the matching check block are sent to the service node, and the service node stores the received data. When the consensus node A needs to recover the block B or the consensus node C needs to synchronize the block B, the consensus network is unavailable, and the block B cannot be recovered based on the block data stored by the service nodes in the witness network, the consensus node A or the consensus node C can obtain each check block of the block B from the service nodes in the witness network, and then determine a data recovery reference matrix based on the coding matrix and each check block of the block B obtained from the service nodes in the witness network. Finally, block B can be successfully recovered based on the data recovery reference matrix and each obtained check block of the block B.

The block recovery solution provided by the embodiments of the present application has been briefly described above. The block recovery solution (that is, the data processing method described below) will be described in detail below.

The data processing method provided by the embodiments of the present application is implemented based on the hierarchical blockchain network shown in FIG. 2*a*. The data processing method includes three stages: a check block generation and storage stage, a block data and check block synchronization stage, and a block recovery stage. The processing process of each stage is described in detail below.

Figure 4:
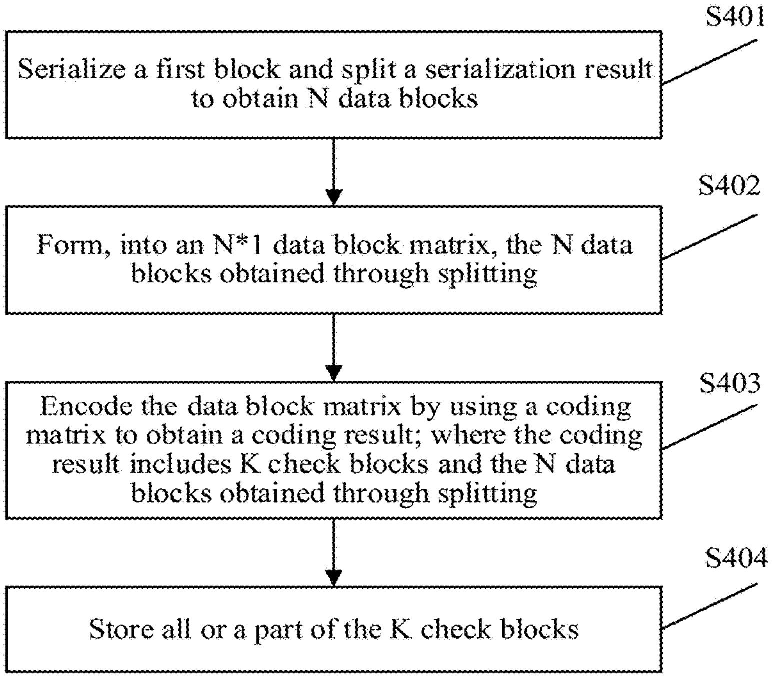
FIG. 4 shows a process of a check block generation and storage stage according to one embodiment of the present application.

1. The check block generation and storage stage are implemented by the target consensus node in the consensus network (any consensus node in the consensus network). FIG. 4 shows a processing process of a check block generation and storage stage in the data processing method according to one embodiment of the present application. The check block generation and storage stage include but is not limited to the following operations:

S401: Serialize a first block and split a serialization result to obtain N data blocks.

In this embodiment of the present application, the first block is any block on the blockchain (that is, the blockchain maintained by the consensus node in the consensus network), and N is a positive integer greater than 1. Serialization refers to breaking down data into a stream of bytes. After the serialization of the first block is completed, the stream of bytes obtained through serialization is split to obtain a total of N data blocks: $D_1$, $D_2$, . . . , and $D_N$. The stream of bytes obtained through serialization can be split according to the same data amount, to obtain N data blocks, or certainly can be split according to different data amounts. This embodiment of the present application does not limit the splitting method.

A subscript of the data block $D_i$ (i is any one of 1 to N) may indicate the order of the corresponding data block in the serialization processing result, for example, a data block identified as $D_1$ is the first data block in the serialization processing result. Certainly, the subscript of the data block $D_1$ may also be unrelated to the order of the corresponding data block in the serialization processing result, for example, a data block identified as $D_3$ may be the first data block in the serialization processing result.

S402: The N data blocks obtained by splitting are formed into an N*1 data block matrix. The data block matrix is shown as 504 in FIG. 5.

S403: Encode the data block matrix by using the coding matrix to obtain a coding result. The coding result includes the K check blocks and the N data blocks obtained through splitting. K is a positive integer greater than 1.

In this embodiment of the present application, the coding matrix may be constructed based on the Vandermond matrix, and any W*H sub-matrix of the coding matrix is invertible. The coding matrix may be obtained by combining an N*N identity matrix and a K*N coding parameter matrix. The form of the coding matrix may be shown as 501 in FIG. 5, and includes an N*N identity matrix shown as 502 and a K*N coding parameter matrix shown as 503, and specific values of the total K*N coding parameters of $M_{11}$, $M_{12}$, . . . , and $M_{KN}$ shown in 503 are defined by the target consensus node, as long as it can be improved that any W*H sub-matrix of the coding matrix can be invertible after definition. W is a positive integer greater than or equal to 1 and less than or equal to K+N, H is a positive integer greater than or equal to 1 and less than or equal to N, and W and H may be the same or different. K may be the same as N or different from N.

Figure 5:
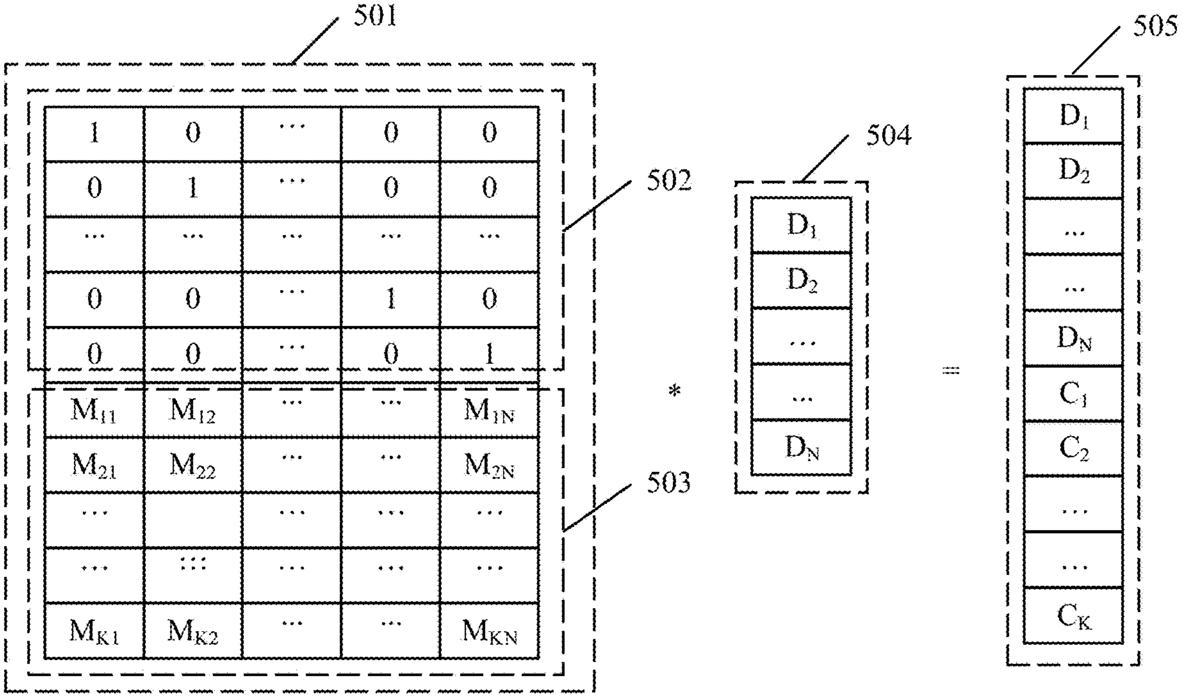
FIG. 5 shows a check block generation manner according to one embodiment of the present application.

In one embodiment, encoding the data block matrix by using the coding matrix may be: performing matrix multiplication on the coding matrix and the data block matrix. As shown in FIG. 5, after matrix multiplication on the coding matrix 501 and the data block matrix 504, the coding result shown as 505 is obtained. The coding result is an (N+K)*1 matrix, and the first N elements of the matrix are the N data blocks $D_1$, $D_2$, . . . , and $D_N$ of the first block, and the last K elements of the matrix are the check blocks $C_1$, $C_2$, . . . , and $C_K$ generated for the N data blocks. Each check block $C_i$ (i is any one of 1 to K) is generated based on a row of elements of the coding parameter matrix and the N data blocks, for example, the check block $C_1$ is obtained based on the first row of elements ($M_{11}$, $M_{12}$, . . . , and $M_{1N}$) of the coding parameter matrix and the data block matrix ($D_1$, $D_2$, . . . , and $D_N$), that is, the check block $C_1$ and the first row of elements ($M_{11}$, $M_{12}$, . . . , and $M_{1N}$) of the coding parameter matrix correspond to each other. Other cases are similar, and details are not described herein again.

S404: Store all or a part of the K check blocks.

In this embodiment of the present application, the target consensus node may store all K check blocks of the first block. When the value of K is relatively large (such as 100000), if all K check blocks of the first block are to be stored, a larger storage space is required. In addition, each consensus node in the consensus network generates K check blocks of the first block by using the above method. If each consensus node stores all K check blocks of the first block, this causes data redundancy. In order to save storage space and reduce data redundancy, the K check blocks of the first block may be separately stored in multiple consensus nodes in the consensus network. In this case, the target consensus node only needs to store a part of the K check blocks of the first block.

In one embodiment, if the consensus network is formed by networking of G (G is a positive integer greater than 1) consensus nodes, G may be used as the value of K, that is, K and G are the same. The target consensus node may determine, from the K check blocks of the first block, a check block whose arrangement identifier matches the arrangement identifier of the target consensus node in the consensus network, and only store the matching check block. For example, the subscript of the check block $C_i$ is its arrangement identifier, which is configured for indicating the order of the check block among the K check blocks. The consensus node in the consensus network also has an arrangement identifier configured for indicating the arrangement order of the node. Assuming that the arrangement identifier of the target consensus node indicates that the arrangement order of the node in the consensus network is the second position, the target consensus node may use the check block $C_2$ as the matching check block, and only store the check block $C_2$. Accordingly, each consensus node in the consensus network stores one of the K check blocks of the first block, and different consensus nodes store different check blocks of the first block.

In one embodiment, K and G are the same, and N and G are also the same, that is, K, N, and G are the same. In addition, W and H are also the same.

Operation S401 to operation S404 may be executed after the target consensus node puts the first block on the chain (or stores on the blockchain).

In one embodiment, after determining the K check blocks of the first block, hash calculation may be performed on each of the K check blocks to obtain K hash values. Then, a Merkle tree is constructed based on the calculated K hash values, and the root of the constructed Merkle tree is added to the block header of the second block. The second block is the next block of the first block on the blockchain, that is, a block whose block height is greater than that of the first block by 1. After obtaining the second block and before putting the second block on the chain, the root of the Merkle tree is added to the block header of the second block. In this case, the above operations may be executed by the target consensus node. The root of the Merkle tree may also be added to the block header of the second block during the process of generating the second block. In this case, the root of the Merkle tree may also participate in the calculation of the hash value of the block header of the second block. In this case, the above operations are executed by a block generation node of the second block (which may be the target consensus node or other consensus nodes in the consensus network).

Each consensus node in the consensus network performs operation S401 to operation S404 for each block on the blockchain to complete the generation and storage of the check block for each block. For specific methods of implementation, refer to the above description, and details are not described herein. In addition, for the same block, the coding matrices used by different consensus nodes are the same. Coding matrices used for different blocks may be the same or different.

Figure 6:
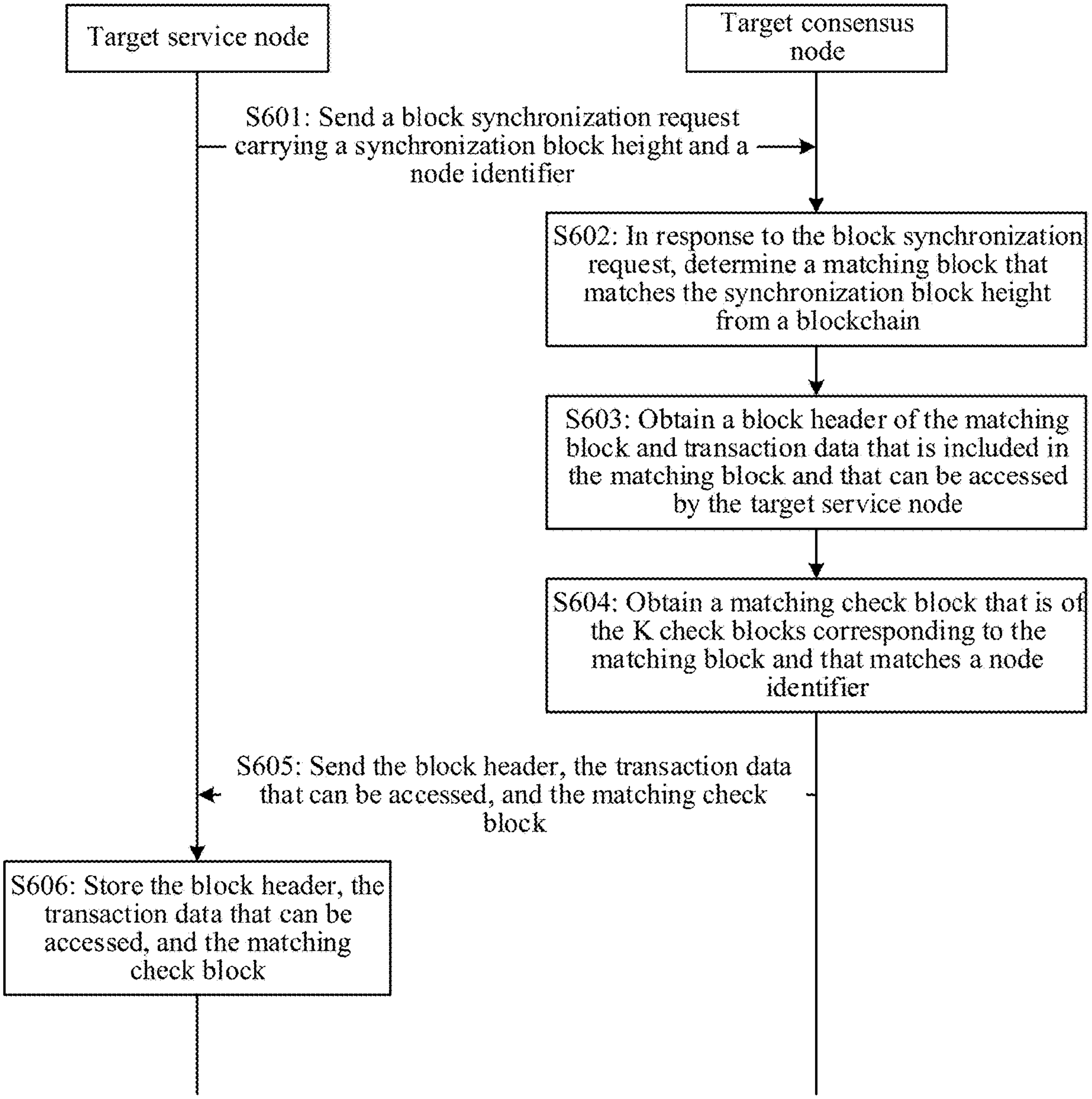
FIG. 6 shows a process of a synchronization stage of block data and a check block according to one embodiment of the present application.

2. The block data and check block synchronization stage are jointly executed by the target service node in the witness network (any service node in the witness network) and the target consensus node in the consensus network. FIG. 6 shows a processing process of the block data and check block synchronization stage included in the data processing method according to one embodiment of the present application. The block data and check block synchronization stage includes but is not limited to the following operations:

S601: A target service node sends a block synchronization request to a target consensus node in a consensus network, where the block synchronization request carries a synchronization block height and a node identifier of the target service node.

In this embodiment of the present application, the target consensus node may be any consensus node in the consensus network, or may be a consensus node closest to the target service node in the consensus network. Being closest means the shortest distance or the shortest communication time. The target consensus node may also be a consensus node that can be accessed by the target service node in the consensus network. The synchronization block height is a block height of a target block that needs to be synchronized, and the target block is a block on a blockchain maintained by the consensus node in the consensus network. The block synchronization request is configured for requesting the target consensus node to return related data of the target block.

S602: In response to the block synchronization request, the target consensus node determines a matching block that matches the synchronization block height from a blockchain.

In this embodiment of the present application, the target consensus node may query, from the blockchain, the block whose block height is the synchronization block height, and determine, as the matching block, the block whose block height is the synchronization block height. The matching block is the target block that the target service node needs to synchronize.

S603: The target consensus node obtains a block header of the matching block and transaction data that is included in the matching block and that can be accessed by the target service node.

In this embodiment of the present application, the target consensus node obtains the block header of the matching block, detects whether transaction data included in the block body of the matching block includes transaction data that can be accessed by the target service node, and if yes, obtains, from the block body of the matching block, the transaction data that can be accessed by the target service node, or if not, obtains no transaction data.

S604: The target consensus node obtains a matching check block that is of the K check blocks corresponding to the matching block and that matches a node identifier of the target service node.

In this embodiment of the present application, the K check blocks corresponding to the matching block are generated and stored in the consensus node in the consensus network in the check block generation and storage stage. The target consensus node may determine a value V based on the node identifier of the target service node, and then determine, as the matching check block, a check block whose subscript value is the same as the value V and that is of the K check blocks $C_1$, $C_2$, . . . , and $C_K$ corresponding to the matching block. If storing the matching check block, the target consensus node directly obtains the matching check block from its own storage space. On the contrary, if not storing the matching check block, the target consensus node obtains the matching check block from other consensus nodes in the consensus network.

In one embodiment, a calculation method of the value V is as follows:

$$V = \text{Hash}(\text{id}) \bmod K$$

id represents the node identifier of the target service node, Hash represents a hash operation, and mod represents a modulo operation. The above formula means that after calculating the hash value of the node identifier id and dividing the hash value by the value K to obtain the remainder, the value V may be obtained.

In the above method, when different service nodes in the witness network synchronize the block data of the target block (that is, the matching block), different check blocks of the target block may be determined. Accordingly, the K check blocks (all or a part) of the target block may be separately stored in multiple service nodes in the witness network, so that when the target block subsequently needs to be recovered based on the check blocks, this can effectively improve that a sufficient number of check blocks of the target block may be obtained from the service nodes of the witness network, thereby ensuring the recovery success rate of the target block.

S605: The target consensus node sends the block header of the matching block, the transaction data that is included in the matching block and that can be accessed by the target service node, and the matching check block to the target service node.

S606: The target service node stores the block header of the matching block (that is, the target block), the transaction data that is included in the matching block and that can be accessed by the target service node, and the matching check block.

In one embodiment, before storing the matching check block, the block header of the reference block synchronized from the consensus node in the consensus network is first obtained. The reference block is the next block of the target block (that is, the matching block) on the blockchain, that is, a block whose block height is greater than that of the target block by 1. The block header of the reference block includes the root of the Merkel tree constructed based on the K check blocks corresponding to the target block. For a method of adding the root to the block header of the reference block, refer to the above related description and details are not described herein. Then, it is detected whether the matching check block matches the root of the Merkel tree included in the reference block. If yes, the matching check block is stored. This can improve the accuracy of the stored check block. The stored matching check block is used by the consensus node in the consensus network to recover the target block.

In one embodiment, the target consensus node may also obtain a Merkle path of the matching check block, that is, a path from a root node to a node corresponding to the matching check block in the Merkle tree constructed based on the K check blocks corresponding to the target block, and send the Merkle path of the matching check block to the target service node. In this case, the target service node may detect whether the matching check block and the Merkle path of the matching check block match the root of the Merkle tree included in the reference block. If yes, the matching check block and the Merkle path of the matching check block are stored.

Moreover, multiple (or every) service nodes in the witness network synchronize related data for each block on the blockchain based on the above method. If the service node cannot access transaction data in a block, the service node only synchronizes the block header and a check block that matches the service node identifier and that is of the K check blocks of the block. If the service node can access transaction data in a block, the service node synchronizes the block header, the transaction data that can be accessed, and the check block that matches the service node identifier and that is of the K check blocks of the block. Accordingly, the block data (all or a part) of each block on the blockchain and the K check blocks (all or a part) of each block may be separately stored in multiple service nodes in the witness network. Accordingly, when the block subsequently needs to be recovered based on the check blocks, this can effectively improve that a sufficient number of available check blocks may be obtained from the service nodes of the witness network, thereby ensuring the recovery success rate of the block.

Figure 7:
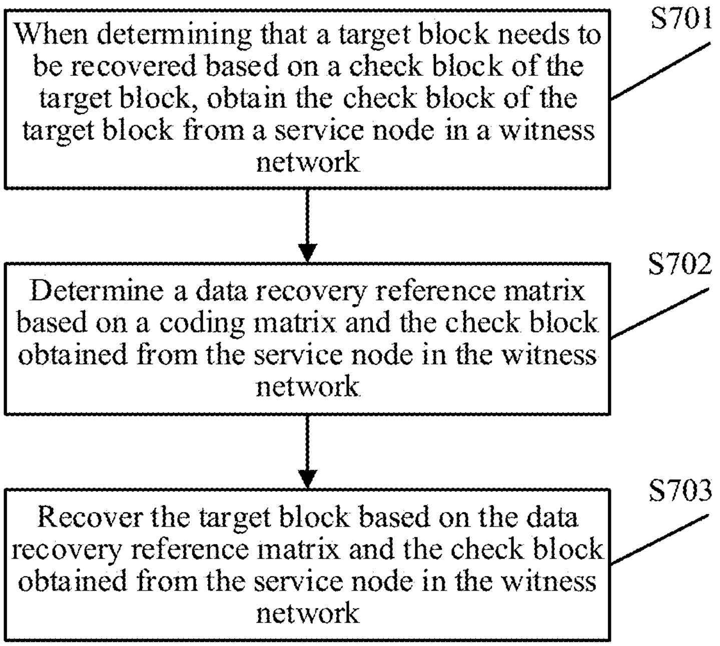
FIG. 7 shows a process of a check recovery stage according to one embodiment of the present application.

3. The block recovery stage is jointly executed by the target consensus node in the consensus network and the service node in the witness network. In this case, the target consensus node may be a consensus node in the consensus network that needs to recover a block because of block data loss caused by factors such as storage space (such as hard disk) damage, and may also be a node that newly joins the consensus network and becomes a consensus node and needs to synchronize all block data. FIG. 7 shows a processing process of the block recovery stage included in the data processing method according to one embodiment of the present application. The block recovery stage includes but is not limited to the following operations:

S701: When determining that a target block needs to be recovered based on a check block of the target block, obtain the check block of the target block from a service node in a witness network.

In this embodiment of the present application, the target block is a block that needs to be recovered, and may be any block on the blockchain. If detecting that the target consensus node needs to recover the target block, a proportion of abnormal consensus nodes in the consensus network exceeds a set proportion, and the service node in the witness network does not store all block data of the target block, it is determined that the target block needs to be recovered based on the check block of the target block. The abnormal consensus node is a consensus node that cannot participate in (or complete) the consensus due to reasons such as related data loss or disconnection. The set proportion may be, for example, ½ or ⅓, and the value of the set proportion may be determined based on consensus rules. When the number of consensus nodes that cannot participate in the consensus exceeds the set proportion, it means that the consensus nodes in the consensus network cannot reach consensus, and in this case, the consensus network is unavailable. In this case, the correctness (or availability) of the target block stored by other consensus nodes cannot be determined, and the target block cannot be directly synchronized from other consensus nodes. In this case, if all the block data of the target block cannot be obtained from the service nodes in the witness network, the target block can only be recovered based on the check block of the target block.

When determining that a target block needs to be recovered based on a check block of the target block, the target consensus node may obtain the check block of the target block from a service node in a witness network specifically in the following manner: broadcasting, by the target consensus node, a check block obtaining request about the target block to the service node in the witness network, where the check block obtaining request may carry the block height of the target block. After receiving the check block obtaining request, the service node of the witness network queries whether the check block of the target block is stored, and if the check block of the target block is stored, sends the stored check block of the target block to the target consensus node.

In one embodiment, the check block obtaining request not only indicates the need to obtain the check block of the target block, but also indicates the need to obtain the block header of the reference block. The reference block is the next block of the target block on the blockchain, that is, a block whose block height is greater than that of the target block by 1. The block header of the reference block includes a root of a Merkle tree constructed based on the K check blocks corresponding to the target block. After obtaining the check block of the target block and the block header of the reference block from the service node in the witness network, the target consensus node detects whether the check block is consistent with the root of the Merkle tree included in the block header of the reference block, and if yes, determines that the check block is valid and may be configured for recovering the target block, or if not, discards the check block. This may improve the accuracy of the recovered target block, avoid useless repeated operations, and improve the recovery efficiency of the target block.

In another embodiment, in addition to indicating the need to obtain the check block of the target block and the block header of the reference block, the check block obtaining request also indicates the need to obtain the Merkle path of the check block of the target block. The Merkle path is a path from a root node to a node corresponding to the check block in the Merkle tree constructed based on the K check blocks corresponding to the target block, and is obtained by the service node when synchronizing block data of the target block from the consensus node. After obtaining the check block of the target block, the Merkle path of the check block, and the block header of the reference block from the service node in the witness network, the target consensus node detects whether the check block and the Merkle path of the check block are consistent with the root of the Merkle tree included in the block header of the reference block, and if yes, determines that the check block is valid and may be configured for recovering the target block, or if not, discards the check block.

S702: Determine a data recovery reference matrix based on a coding matrix and the check block obtained from the service node in the witness network.

In this embodiment of the present application, a data recovery reference matrix is determined based on the coding matrix and the valid check block obtained from the service node in the witness network.

Method 1: When all K check blocks of the target block are obtained from the service nodes in the witness network, and all the K check blocks are valid, matrix elements corresponding to the K check blocks are obtained from the coding matrix corresponding to the target block, and the data recovery reference matrix is determined based on the obtained matrix elements corresponding to the K check blocks.

As described above, each check block $C_i$ (i is any one of 1 to K) of the K check blocks is generated based on a row of elements of the coding parameter matrix included in the coding matrix and the N data blocks of the target block. As shown in FIG. 5, for example, the check block $C_1$ is obtained based on the first row of elements ($M_{11}$, $M_{12}$, . . . , and $M_{1N}$) of the coding parameter matrix and the data block matrix ($D_1$, $D_2$, . . . , and $D_N$), that is, the check block $C_1$ and the first row of elements ($M_{11}$, $M_{12}$, . . . , and $M_{1N}$) of the coding parameter matrix correspond to each other. That is, the matrix elements corresponding to the K check blocks in the coding matrix are elements in the coding parameter matrix included in the coding matrix, and the coding parameter matrix (503 in FIG. 5) may be directly determined as the data recovery reference matrix.

The coding parameter matrix is a sub-matrix of the coding matrix, and the data recovery reference matrix determined by this method is an invertible matrix. In one embodiment, K and N are the same, and the data recovery reference matrix determined in this case is a K*K (or N*N) sub-matrix of the coding matrix. This can effectively improve the invertibility of the data recovery reference matrix. In other embodiments, K and N may be the same as M (the number of consensus nodes in the consensus network).

Method 2: When only X (X is less than K) valid check blocks of the K check blocks of the target block are obtained from the service nodes in the witness network, the target block is obtained from other consensus nodes in the consensus network (any consensus node that stores the complete target block). Since the consensus nodes in the consensus network cannot reach consensus at this time, the correctness (or availability) of the target block stored by other consensus nodes cannot be determined, and the target block obtained from other consensus nodes cannot be directly used. After obtaining, from other consensus nodes, the target block stored by the other consensus nodes, the obtained target block is serialized and the serialization result is split to obtain N data blocks (the splitting method needs to be the same as the splitting method of the target block in the check block generation and storage stage). K−X data blocks are randomly obtained from the N data blocks obtained through splitting, and then matrix elements corresponding to the X check blocks and the K−X data blocks are obtained from the coding matrix corresponding to the target block, and the data recovery reference matrix is determined based on the obtained matrix elements corresponding to the X check blocks and the K−X data blocks.

In one embodiment, row elements corresponding to the X check blocks in the coding parameter matrix may be obtained based on the correspondence between the check block $C_i$ (i is any one of 1 to K) and row elements of the coding parameter matrix included in the coding matrix. According to row positions of the K−X data blocks in the data block matrix (that is, a data block matrix including the N data blocks of the target block in the check block generation and storage stage, as shown as 504 in FIG. 5, that is, an N*1 data block matrix including the N data blocks in the stage of determining the check block of the target block) including the N data blocks, corresponding row elements in the N*N identity matrix (502 in FIG. 5) included in the coding matrix are obtained. Then, the data recovery reference matrix is determined based on the obtained row elements corresponding to the X check blocks in the coding parameter matrix and the row elements corresponding to the K−X data blocks in the N*N identity matrix.

For example, it is assumed that X is a value of K−3 and the X check blocks are the first X check blocks $C_1$, $C_2$, . . . , and $C_X$ of the K check blocks of the target block. In this case, K−X is 3. Assuming that the three randomly selected data blocks are $D_2$, $D_{N-1}$, and $D_N$, the determined data recovery reference matrix is shown as 801 in FIG. 8. The data recovery reference matrix 801 includes two parts: 802 and 803. 802 includes the second, the (N−1)th, and the $N^{th}$ rows of elements corresponding to the data blocks $D_2$, $D_{N-1}$, and $D_N$ in the identity matrix shown as 502 in FIG. 5. 803 includes the first to the $X^{th}$ rows of elements corresponding to the check blocks $C_1$, $C_2$, and $C_X$ of the data block in the coding parameter matrix shown as 503 in FIG. 5.

The data recovery reference matrix determined using the above method is a sub-matrix of the coding matrix, and therefore the determined data recovery reference matrix is an invertible matrix. In one embodiment, K and N are the same, and the data recovery reference matrix determined in this case is a K*K (or N*N) sub-matrix of the coding matrix. This can effectively improve the invertibility of the data recovery reference matrix. In other embodiments, K and N may be the same as G (the number of consensus nodes in the consensus network).

S703: Recover the target block based on the data recovery reference matrix and the check block obtained from the service node in the witness network.

In the embodiments of the present application, the target block is recovered based on the data recovery reference matrix and the valid check block obtained from the service node in the witness network.

Corresponding to the above two embodiments s of determining the data recovery reference matrix, there are also two embodiments of operation S702:

Method 1: After the data recovery reference matrix is determined using the above method 1, the inverse matrix of the data recovery reference matrix is determined, and then the target block is recovered based on the inverse matrix of the data recovery reference matrix and the obtained K check blocks of the target block.

Figure 9:
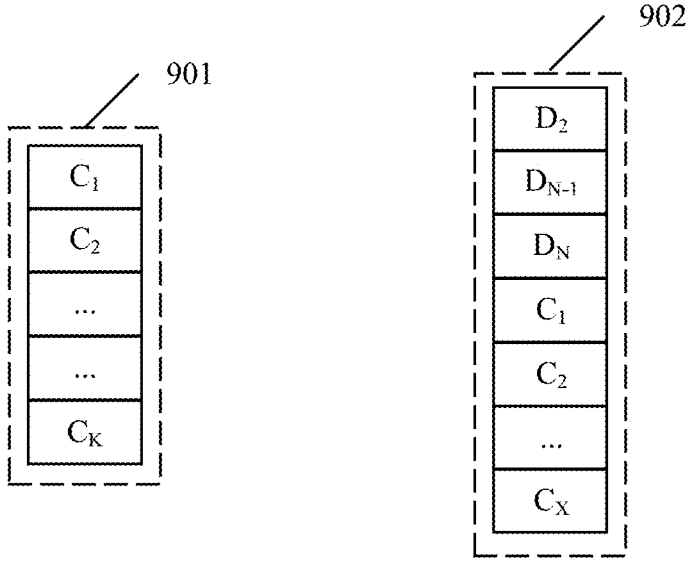
FIG. 9 is a schematic diagram of a data matrix according to one embodiment of the present application.

In one embodiment, the obtained K check blocks of the target block are arranged into a K*1 data matrix (for example, shown as 901 in FIG. 9), and matrix multiplication is performed on the inverse matrix of the data recovery reference matrix and the check block matrix, to obtain the data block matrix ($D_1$, $D_2$, . . . , and $D_N$) including N data blocks of the target block, and then the complete target block may be recovered based on the data block matrix ($D_1$, $D_2$, . . . , and $D_N$).

Method 2: After the data recovery reference matrix is determined using the above method 2, the inverse matrix of the data recovery reference matrix is determined, and then the target block is recovered based on the inverse matrix of the data recovery reference matrix, the obtained X check blocks of the target block, and randomly obtained K−X data blocks of the target block.

In one embodiment, the randomly obtained K−X data blocks of the target block and the obtained X check blocks of the target block are arranged into a K*1 data matrix (shown as 902 in FIG. 9, which is determined in correspondence with the example in the method 2), and matrix multiplication is performed on the inverse matrix of the data recovery reference matrix and the check block matrix, to obtain the data block matrix ($D_1$, $D_2$, . . . , and $D_N$) including N data blocks of the target block, and then the complete target block may be recovered based on the data block matrix ($D_1$, $D_2$, . . . , and $D_N$).

In one embodiment, in order to improve the accuracy of the recovered target block, it may be detected whether the target block recovered based on the inverse matrix of the data recovery reference matrix, the X check blocks, and the K−X data blocks is consistent with the target block obtained from the consensus node in the consensus network; and if the target blocks are consistent, it is determined that the target block is recovered successfully; or if the target blocks are inconsistent, it means that the target block obtained from another consensus node is incorrect, and the recovered target block is also incorrect (the block even cannot be recovered in this case). In this case, the target block stored by another consensus node (different from the previous consensus node) may be obtained again from another consensus node, and the target block is recovered using the above method until the recovered target block is consistent with the target block obtained from the consensus node. In other embodiments, target blocks stored by multiple consensus nodes may be obtained from the multiple consensus nodes each time, and a block with the largest proportion among the multiple obtained target blocks may be processed, for example, target blocks stored by 5 consensus nodes are obtained from the 5 consensus nodes, and if four blocks are the same and the remaining block is different, the same block is processed. This can improve the accuracy of the obtained target block to a certain extent and improve the success of the recovery of the target block.

The above recovery principle is shown in the following formula:

$$P' = P * L'$$

$$P' * L'^{(-1)} = P * L' * L'^{(-1)} = P * (L' * L'^{(-1)}) = P$$

Figure 8:
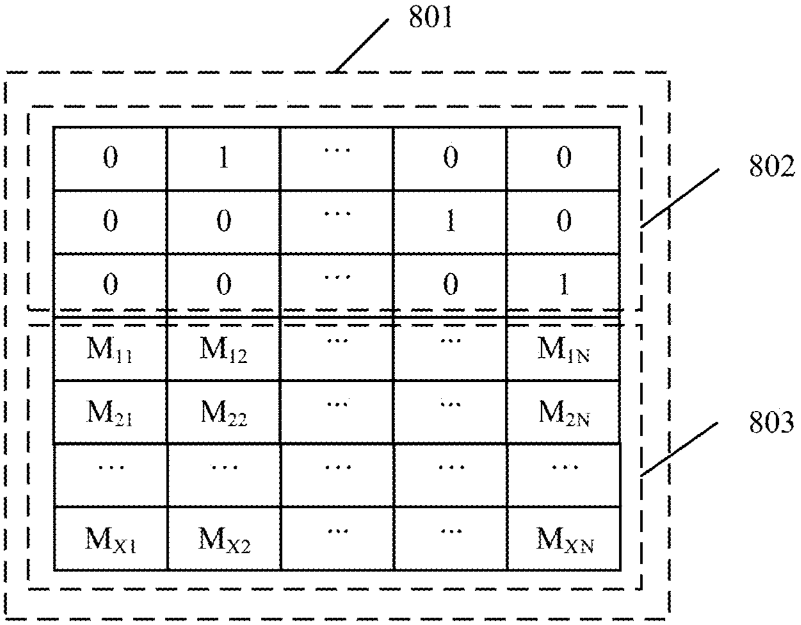
FIG. 8 is a schematic diagram of a data recovery reference matrix according to one embodiment of the present application.

P represents the data block matrix including the N data blocks of the block; and P'represents a data matrix obtained by arranging the obtained K check blocks in the above method 1, or represents a data matrix obtained by arranging the randomly obtained K−X data blocks and the obtained X check blocks in the above method 2, L represents the determined data recovery reference matrix, $L'^{(-1)}$ represents the inverse matrix of L, and L' $*L'^{(-1)}$ is the identity matrix. P'=P*L'. If the data recovery reference matrix shown in FIG. 8 is multiplied by the data block matrix including N data blocks shown as 504 in FIG. 5, a data matrix obtained by arranging the randomly obtained K−X data blocks and the obtained X check blocks shown as 902 in FIG. 9 can be obtained.

In the above method, the target consensus node may recover all its missing blocks. When the target consensus node is a newly added consensus node, the target consensus node may also complete the synchronization of all blocks on the blockchain.

Based on the hierarchical blockchain network, the embodiments of the present application provide a solution based on erasure code to improve the availability of blockchain data. The solution can improve that confidential transactions on the blockchain are not exposed to a node other than the consensus node (the service node can only synchronize a transaction visible to the service node). When the consensus network is unavailable and the block cannot be recovered based on the block data stored by the service node, the block can be successfully recovered based on the check block stored by the service node. In addition, the availability of the recovered block can be effectively improved.

The execution body configured for executing each operation in the above method embodiment may include hardware, software, or a combination of software and hardware. In addition, in one embodiment of the present application, related data such as blockchains, blocks, block headers, block bodies, and transaction data is all authorized by users. When the above embodiments of the present application are applied to specific products or technologies, the data used requires user permission or consent, and the collection, use and processing of related data need to comply with related laws, regulations and standards of related countries and regions.

Figure 10:
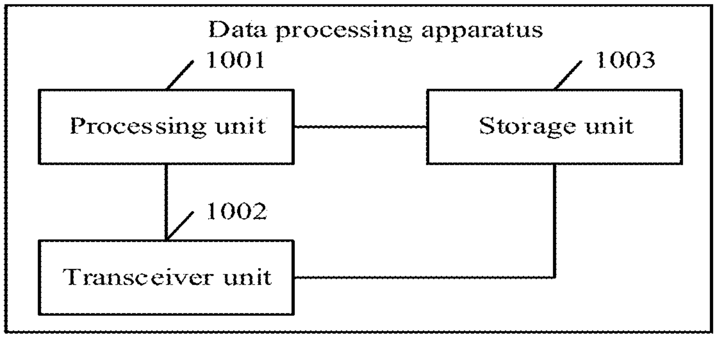
FIG. 10 is a schematic structural diagram of a data processing apparatus according to one embodiment of the present application.

FIG. 10 is a schematic structural diagram of a data processing apparatus according to one embodiment of the present application. The apparatus described in this embodiment of the present application includes a processing unit 1001, a transceiver unit 1002, and a storage unit 1003. The data processing apparatus is applied to a blockchain network, the blockchain network including a witness network and a consensus network, the witness network being formed by networking of multiple service nodes, the consensus network being formed by networking of multiple consensus nodes, and the witness network and the consensus network establishing a communication connection.

In one embodiment, the data processing apparatus may correspond to the target consensus node in the consensus network mentioned above.

The processing unit 1001 is configured to: when determining that a target block needs to be recovered based on a check block of the target block, obtain the check block of the target block from the service node in the witness network through the transceiver unit 1002. The processing unit 1001 is further configured to determine a data recovery reference matrix based on a coding matrix and the check block obtained from the service node in the witness network.

The processing unit 1001 is further configured to recover the target block based on the data recovery reference matrix and the check block obtained from the service node in the witness network;

the target block being a block on a blockchain maintained by the consensus node in the consensus network; the check block of the target block stored by the service node being obtained by the service node when synchronizing related block data of the target block from the consensus node in the consensus network; the check block being obtained by the consensus node in the consensus network by encoding the target block using the coding matrix; and the check block being configured for recovering the target block.

In one embodiment, the processing unit 1001 is further configured to: if detecting that the target block needs to be recovered, a proportion of abnormal consensus nodes in the consensus network exceeds a set proportion, and the service node in the witness network does not store all block data of the target block, determine that the target block needs to be recovered based on the check block of the target block.

In one embodiment, the target block has K check blocks, where K is a positive integer greater than 1; and when determining a data recovery reference matrix based on a coding matrix and the check block obtained from the service node in the witness network; and recovering the target block based on the data recovery reference matrix and the check block obtained from the service node in the witness network, the processing unit 1001 is specifically configured to:

- when the K check blocks of the target block are obtained from the service node in the witness network, obtain, from the coding matrix, matrix elements corresponding to the K check blocks; determine the data recovery reference matrix based on the obtained matrix elements corresponding to the K check blocks, and determine an inverse matrix of the data recovery reference matrix; and recover the target block based on the inverse matrix of the data recovery reference matrix and the K check blocks;
- when X check blocks of the target block are obtained from the service node in the witness network, obtain the target block from the consensus node in the consensus network; where X is a positive integer less than K; serialize the obtained target block and split a serialization result to obtain N data blocks; where N is a positive integer greater than 1; obtain K−X data blocks from the N data blocks obtained through splitting; obtain, from the coding matrix, matrix elements corresponding to the X check blocks and the K−X data blocks, and determine the data recovery reference matrix based on the obtained matrix elements corresponding to the X check blocks and the K−X data blocks; and determine an inverse matrix of the data recovery reference matrix, and recover the target block based on the inverse matrix of the data recovery reference matrix, the X check blocks, and the K−X data blocks.

In one embodiment, the processing unit 1001 is further configured to: detect whether the target block recovered based on the inverse matrix of the data recovery reference matrix, the X check blocks, and the K−X data blocks is consistent with the target block obtained from the consensus node in the consensus network; and if the target blocks are consistent, determine that the target block is recovered successfully.

In one embodiment, the target block has K check blocks, where K is a positive integer greater than 1; and the processing unit 1001 is further configured to: obtain a block header of a reference block from the service node in the witness network through the transceiver unit 1002; where the reference block is a next block of the target block on the blockchain, and the block header of the reference block includes a root of a Merkle tree constructed based on the K check blocks corresponding to the target block; and discard a check block that is of the obtained check blocks of the target block and that does not match the root of the Merkle tree included in the block header of the reference block. That is, subsequently, the data recovery reference matrix is determined based on the coding matrix and the obtained check block that matches the root of the Merkle tree included in the block header of the reference block, and the target block is recovered based on the data recovery reference matrix and the obtained check block that matches the root of the Merkle tree included in the block header of the reference block.

In one embodiment, the processing unit 1001 is further configured to: serialize a first block and split a serialization result to obtain N data blocks; where the first block is any block on the blockchain; and N is a positive integer greater than 1; form, into an N*1 data block matrix, the N data blocks obtained through splitting; encode the data block matrix by using the coding matrix to obtain a coding result; where the coding result includes the K check blocks and the N data blocks obtained through splitting; and K is a positive integer greater than 1; and the storage unit 1003 stores all or a part of the K check blocks.

In one embodiment, the consensus network is formed by networking of G consensus nodes, G is a positive integer greater than 1, and K is equal to G; and when storing all or a part of the K check blocks through the storage unit 1003, the processing unit 1001 is specifically configured to: determine, from the K check blocks, a matching check block whose arrangement identifier matches an arrangement identifier of the data processing apparatus (or a target consensus node) in the consensus network; and store the matching check block through the storage unit 1003.

In one embodiment, the processing unit 1001 is further configured to: perform hash calculation on each of the K check blocks to obtain K hash values; and construct a Merkle tree based on the K hash values, and add the root of the constructed Merkle tree to a block header of a second block; where the second block is a next block of the first block on the blockchain.

In one embodiment, the transceiver unit 1002 is further configured to receive a block synchronization request transmitted by a target service node, where the block synchronization request carries a synchronization block height and a node identifier of the target service node; where the target service node is any service node in the witness network;

the processing unit 1001 is further configured to: determine, from the blockchain, a matching block that matches the synchronization block height, and obtain a block header of the matching block and transaction data that is included in the matching block and that can be accessed by the target service node; obtain a matching check block of the K check blocks that matches the node identifier; and transceiver unit 1002 is further configured to transmit the block header of the matching block, the transaction data that can be accessed, and the matching check block to the target service node.

In one embodiment, the data processing apparatus may correspond to the target service node in the witness network mentioned above.

The processing unit 1001 is configured to transmit a block synchronization request to the consensus node in the consensus network through the transceiver unit 1002; the block synchronization request carrying a synchronization block height and a node identifier of the data processing apparatus (or the target service node); the synchronization block height being a block height of a target block that needs to be synchronized, and the target block being a block on a blockchain maintained by the consensus node in the consensus network; and the block synchronization request being configured for requesting the consensus node to return related data of the target block;

the transceiver unit 1002 is further configured to receive the related data of the target block returned by the consensus node; the related data including a block header of the target block, transaction data that is included in the target block and that can be accessed by the data processing apparatus (or the target service node), and a matching check block that is of the K check blocks corresponding to the target block and that matches the node identifier; the K check blocks being obtained by encoding the target block using a coding matrix; and K being a positive integer greater than 1; and the storage unit 1003 is configured to store the related data of the target block; the stored matching check block being used by the consensus node in the consensus network to recover the target block.

In one embodiment, the transceiver unit 1002 is further configured to receive a check block obtaining request about the target block transmitted by a target consensus node in the consensus network; the check block obtaining request being broadcast by the target consensus node to the service node in the witness network when the target consensus node determines that the target block needs to be recovered based on the check block of the target block; and the processing unit 1001 is further configured to send, through the transceiver unit 1002, the stored matching check block corresponding to the target block to the consensus node, so that the target consensus node recovers the target block based on the matching check block. In one embodiment, the processing unit 1001 is further configured to: obtain a block header of a reference block synchronized from the consensus node in the consensus network, where the reference block is a next block of the target block on the blockchain, and the block header of the reference block includes a root of a Merkle tree constructed based on the K check blocks corresponding to the target block; and if the matching check block in the related data matches the root of the Merkle tree included in the block header of the reference block, store the matching check block through the storage unit 1003.

Functions of functional units of the data processing apparatus in this embodiment of the present application may be specifically implemented according to the method in the foregoing method embodiment. For a specific implementation process of the apparatus, refer to a related description in the foregoing method embodiment. Details are not described herein again.

In the embodiments of the present application, the consensus node generates the check block of the block, when the service node synchronizes the block, synchronizes the check block of the block and the related block data of the block to the service node, and when the consensus node needs to recover the block, obtains, from the service node, the check block of the block that needs to be recovered, and can successfully recover the block based on the obtained check block. Accordingly, when the consensus network is unavailable and the block cannot be recovered based on the block data stored by the service node, the block can be successfully recovered based on the check block stored by the service node. This can effectively improve the availability of the recovered block.

In one embodiment, the data processing apparatus provided by the embodiments of the present application can be implemented in a software manner. The data processing apparatus can be stored in the memory, and can be software in the form of programs, plug-ins, or the like, and includes a series of units, including a processing unit, a communication unit, and a storage unit. The processing unit, the communication unit, and the storage unit are configured to implement the data processing method based on a blockchain network provided in the embodiments of the present application.

In some embodiments, the data processing apparatus provided in the embodiments of the present application can also be implemented in a combination of software and hardware. As an example, the data processing apparatus provided in the embodiments of the present application may be a processor in the form of a hardware decoding processor, which is programmed to execute the data processing method based on a blockchain network provided in the embodiments of the present application. For example, the processor in the form of a hardware decoding processor may be one or more application specific integrated circuits (ASIC), DSPs, programmable logic devices (PLD), complex programmable logic devices (CPLD), field programmable gate arrays (FPGA), or other electronic components.

Figure 11:
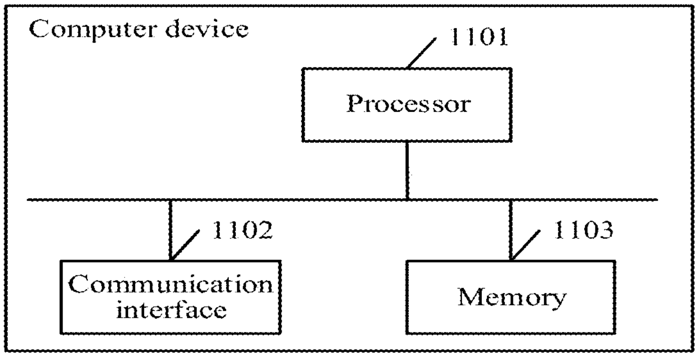
FIG. 11 is a schematic structural diagram of a computer device according to one embodiment of the present application.

FIG. 11 is a schematic structural diagram of a computer device according to one embodiment of the present application. In this embodiment of the present application, the computer device includes: a processor 1101, a communication interface 1102, and a memory 1103. The processor 1101, the communication interface 1102, and the memory 1103 may be connected through a bus or in another manner. Connection through a bus is used as an example in this embodiment of the present application.

The processor 1101 (or referred to as a central processing unit (CPU)) is a computing core and control core of the computer device. The processor may parse various instructions in the computer device and process various data of the computer device. For example, the CPU may be configured to parse the power on and off instructions sent by the user to the computer device, and control the computer device to perform power on and off operations. For another example, the CPU may transfer various types of interactive data between the internal structures of the computer device, and so on. In one embodiment, the communication interface 1102 may include a standard wired interface and a standard wireless interface (such as WiFi and a mobile communication interface), and is controlled by the processor 1101 to be configured to send and receive data. Memory 1103 is a memory device of the computer device, and is configured to store a program and data. Memory 1103 herein may include an internal memory of the computer device, and may also include an expanded memory supported by the computer device. Memory 1103 provides storage space, and the storage space stores an operating system of the computer device, which may include but is not limited to: Android system, iOS system, Windows Phone system, or the like. The present application does not limit this.

In one embodiment of the present application, the computer device is applied to a blockchain network, the blockchain network including a witness network and a consensus network, the witness network being formed by networking of multiple service nodes, the consensus network being formed by networking of multiple consensus nodes, and the witness network and the consensus network establishing a communication connection.

In one embodiment, the computer device may correspond to a target consensus node in the consensus network described above, and by running executable program code in the memory 1103, the processor 1101 performs the following operations:

when determining that a target block needs to be recovered based on a check block of the target block, obtaining the check block of the target block from the service node in the witness network through the communication interface 1102; determining a data recovery reference matrix based on a coding matrix and the check block obtained from the service node in the witness network; and recovering the target block based on the data recovery reference matrix and the check block obtained from the service node in the witness network;

the target block being a block on a blockchain maintained by the consensus node in the consensus network; the check block of the target block stored by the service node being obtained by the service node when synchronizing related block data of the target block from the consensus node in the consensus network; the check block being obtained by the consensus node in the consensus network by encoding the target block using the coding matrix; and the check block being configured for recovering the target block.

In one embodiment, the processor 1101 is further configured to: if detecting that the target block needs to be recovered, a proportion of abnormal consensus nodes in the consensus network exceeds a set proportion, and the service node in the witness network does not store all block data of the target block, determine that the target block needs to be recovered based on the check block of the target block.

In one embodiment, the target block has K check blocks, where K is a positive integer greater than 1; and when determining a data recovery reference matrix based on a coding matrix and the check block obtained from the service node in the witness network; and recovering the target block based on the data recovery reference matrix and the check block obtained from the service node in the witness network, the processor 1101 is specifically configured to:

when the K check blocks of the target block are obtained from the service node in the witness network, obtain, from the coding matrix, matrix elements corresponding to the K check blocks; determine the data recovery reference matrix based on the obtained matrix elements corresponding to the K check blocks, and determine an inverse matrix of the data recovery reference matrix; and recover the target block based on the inverse matrix of the data recovery reference matrix and the K check blocks;

when X check blocks of the target block are obtained from the service node in the witness network, obtain the target block from the consensus node in the consensus network; where X is a positive integer less than K; serialize the obtained target block and split a serialization result to obtain N data blocks; where N is a positive integer greater than 1; obtain K−X data blocks from the N data blocks obtained through splitting; obtain, from the coding matrix, matrix elements corresponding to the X check blocks and the K−X data blocks, and determine the data recovery reference matrix based on the obtained matrix elements corresponding to the X check blocks and the K−X data blocks; and determine an inverse matrix of the data recovery reference matrix, and recover the target block based on the inverse matrix of the data recovery reference matrix, the X check blocks, and the K−X data blocks.

In one embodiment, the processor 1101 is further configured to: detect whether the target block recovered based on the inverse matrix of the data recovery reference matrix, the X check blocks, and the K−X data blocks is consistent with the target block obtained from the consensus node in the consensus network; and if the target blocks are consistent, determine that the target block is recovered successfully.

In one embodiment, the target block has K check blocks, where K is a positive integer greater than 1; and the processor 1101 is further configured to: obtain a block header of a reference block from the service node in the witness network through the communication interface 1102; where the reference block is a next block of the target block on the blockchain, and the block header of the reference block includes a root of a Merkle tree constructed based on the K check blocks corresponding to the target block; and discard a check block that is of the obtained check blocks of the target block and that does not match the root of the Merkle tree included in the block header of the reference block. That is, subsequently, the data recovery reference matrix is determined based on the coding matrix and the obtained check block that matches the root of the Merkle tree included in the block header of the reference block, and the target block is recovered based on the data recovery reference matrix and the obtained check block that matches the root of the Merkle tree included in the block header of the reference block.

In one embodiment, the processor 1101 is further configured to: serialize a first block and split a serialization result to obtain N data blocks; where the first block is any block on the blockchain; and N is a positive integer greater than 1; form, into an N*1 data block matrix, the N data blocks obtained through splitting; encode the data block matrix by using the coding matrix to obtain a coding result; where the coding result includes the K check blocks and the N data blocks obtained through splitting; and K is a positive integer greater than 1; and store all or a part of the K check blocks through the memory 1103.

In one embodiment, the consensus network is formed by networking of G consensus nodes, G is a positive integer greater than 1, and K is equal to G; and when storing all or a part of the K check blocks through the memory 1103, the processor 1101 is specifically configured to: determine, from the K check blocks, a matching check block whose arrangement identifier matches an arrangement identifier of the computer device (or a target consensus node) in the consensus network; and store the matching check block through the memory 1103.

In one embodiment, the processor 1101 is further configured to: perform hash calculation on each of the K check blocks to obtain K hash values; and construct a Merkle tree based on the K hash values, and add the root of the constructed Merkle tree to a block header of a second block; where the second block is a next block of the first block on the blockchain.

In one embodiment, the processor 1101 is further configured to: receive, through the communication interface 1102, a block synchronization request transmitted by a target service node, where the block synchronization request carries a synchronization block height and a node identifier of the target service node; where the target service node is any service node in the witness network; and determine, from the blockchain, a matching block that matches the synchronization block height, and obtain a block header of the matching block and transaction data that is included in the matching block and that can be accessed by the target service node; obtain a matching check block of the K check blocks that matches the node identifier; and transmit the block header of the matching block, the transaction data that can be accessed, and the matching check block to the target service node through the communication interface 1102.

In one embodiment, the computer device may correspond to a target service node in the witness network described above, and by running executable program code in the memory 1103, the processor 1101 performs the following operations:

transmitting a block synchronization request to the consensus node in the consensus network through the communication interface 1102; the block synchronization request carrying a synchronization block height and a node identifier of the computer device (or a target service node); the synchronization block height being a block height of a target block that needs to be synchronized, and the target block being a block on a blockchain maintained by the consensus node in the consensus network; and the block synchronization request being configured for requesting the consensus node to return related data of the target block;

receiving the related data of the target block returned by the consensus node through the communication interface 1102; the related data including a block header of the target block, transaction data that is included in the target block and that can be accessed by the computer device (or a target service node), and a matching check block that is of the K check blocks corresponding to the target block and that matches the node identifier; the K check blocks being obtained by encoding the target block using a coding matrix; and K being a positive integer greater than 1; and storing related data of the target block through memory 1103; the stored matching check block being used by the consensus node in the consensus network to recover the target block.

In one embodiment, the processor 1101 is further configured to: receive, through the communication interface 1102, a check block obtaining request about the target block transmitted by a target consensus node in the consensus network; the check block obtaining request being broadcast by the target consensus node to the service node in the witness network when the target consensus node determines that the target block needs to be recovered based on the check block of the target block; and transmit the stored matching check block corresponding to the target block to the consensus node through the communication interface 1102, so that the target consensus node recovers the target block based on the matching check block.

In one embodiment, the processor 1101 is further configured to: obtain a block header of a reference block synchronized from the consensus node in the consensus network, where the reference block is a next block of the target block on the blockchain, and the block header of the reference block includes a root of a Merkle tree constructed based on the K check blocks corresponding to the target block; and if the matching check block in the related data matches the root of the Merkle tree included in the block header of the reference block, store the matching check block through the memory 1103.

In one embodiment, the processor 1101, the communication interface 1102, and the memory 1103 described in this embodiment of the present application may implement the data processing method based on a blockchain network in the above method embodiment. For a specific implementation process, refer to the related description in the above method embodiment. Details are not described herein again.

In the embodiments of the present application, the consensus node generates the check block of the block, when the service node synchronizes the block, synchronizes the check block of the block and the related block data of the block to the service node, and when the consensus node needs to recover the block, obtains, from the service node, the check block of the block that needs to be recovered, and can successfully recover the block based on the obtained check block. Accordingly, when the consensus network is unavailable and the block cannot be recovered based on the block data stored by the service node, the block can be successfully recovered based on the check block stored by the service node. This can effectively improved the availability of the recovered block.

One embodiment of the present application further provides a computer-readable storage medium. The computer-readable storage medium stores a computer program. When the computer program runs on a computer, the computer is caused to implement the data processing method based on a blockchain network provided by the embodiments of the present application. For a specific implementation, refer to the above description. Details are not described herein again.

One embodiment of the present application further provides a computer program product, including a computer program or a computer instruction, the computer program or the computer instruction being executed by a processor to implement the data processing method based on a blockchain network provided by the embodiments of the present application. For a specific implementation, refer to the above description. Details are not described herein again.

To simplify the description, the foregoing method embodiments are described as a series of action combinations. But persons of ordinary skill in the art know that the present application is not limited to any described sequence of the action, as some operations may adopt other sequences or may be executed simultaneously according to the present application. In addition, a person skilled in the art also knows that all the embodiments described in the specification are preferred embodiments, and the related actions and modules are not necessarily mandatory to the present application.

A person of ordinary skill in the art can understand that, all or some operations in the methods in the foregoing embodiments may be performed by a program instructing related hardware. The program may be stored in a computer-readable storage medium. The storage medium may include: a flash drive, a read-only memory (ROM), a random access memory (RAM), a magnetic disk, an optical disc, and the like.

What is disclosed above is merely exemplary embodiments of the present application, and certainly is not intended to limit the scope of the claims of the present application. Therefore, equivalent variations made in accordance with the claims of the present application shall fall within the scope of the present application.

What is claimed is:

1. A data processing method based on a blockchain network, the blockchain network comprising a witness network and a consensus network, the witness network being formed by multiple service nodes, the consensus network being formed by multiple consensus nodes, and the witness network and the consensus network establishing a communication connection, the method comprising:

when determining that a target block needs to be recovered based on a check block of the target block, obtaining the check block of the target block from the service node in the witness network;

determining a data recovery reference matrix based on a coding matrix and the check block of the target block; and recovering the target block based on the data recovery reference matrix and the check block of the target block, wherein:

the target block being a block on a blockchain maintained by the consensus node in the consensus network; the check block of the target block stored by the service node being obtained by the service node when synchronizing related block data of the target block from the consensus node in the consensus network; the check block of the target block being obtained by the consensus node in the consensus network by encoding the target block using the coding matrix; and the check block of the target block being configured for recovering the target block, wherein a check block in the consensus node is obtained by:

serializing a first block and splitting a serialization result to obtain N data blocks, wherein the first block is a block on the blockchain; and N is a positive integer greater than 1;

forming the N data blocks obtained through splitting into an N*1 data block matrix;

encoding the data block matrix by using the coding matrix to obtain a coding result, wherein the coding result comprises the K check blocks and the N data blocks obtained through splitting, and K is a positive integer greater than 1; and storing at least a part of the K check blocks in the consensus node in the consensus network.

2. The method according to claim 1, further comprising:

in response to detecting that the target block needs to be recovered, a percentage of abnormal consensus nodes in the consensus network exceeds a set percentage, and the service node in the witness network does not store all block data of the target block, determining that the target block needs to be recovered based on the check block of the target block.

3. The method according to claim 1, wherein the determining a data recovery reference matrix based on a coding matrix and the check block obtained from the service node in the witness network; and recovering the target block based on the data recovery reference matrix and the check block obtained from the service node in the witness network comprises:

when the K check blocks of the target block are obtained from the service node in the witness network, obtaining, from the coding matrix, matrix elements corresponding to the K check blocks;

determining the data recovery reference matrix based on the obtained matrix elements corresponding to the K check blocks, and determining an inverse matrix of the data recovery reference matrix; and recovering the target block based on the inverse matrix of the data recovery reference matrix and the K check blocks.

4. The method according to claim 1, wherein the determining a data recovery reference matrix based on a coding matrix and the check block obtained from the service node in the witness network; and recovering the target block based on the data recovery reference matrix and the check block obtained from the service node in the witness network comprises:

when X check blocks of the target block are obtained from the service node in the witness network, obtaining the target block from the consensus node in the consensus network, X being a positive integer less than K;

serializing the obtained target block and splitting a serialization result to obtain N data blocks, N being a positive integer greater than 1;

obtaining K-X data blocks from the N data blocks obtained through splitting;

obtaining, from the coding matrix, matrix elements corresponding to the X check blocks and the K-X data blocks, and determining the data recovery reference matrix based on the obtained matrix elements corresponding to the X check blocks and the K-X data blocks; and determining an inverse matrix of the data recovery reference matrix, and recovering the target block based on the inverse matrix, the X check blocks, and the K-X data blocks.

5. The method according to claim 4, wherein the method further comprises:

detecting whether the target block is consistent with the target block obtained from the consensus node in the consensus network, the target block being recovered based on the inverse matrix of the data recovery reference matrix, the X check blocks, and the K-X data blocks; and determining that the target block is recovered successfully if the target blocks are consistent.

6. The method according to claim 1, further comprising:

obtaining a block header of a reference block from the service node in the witness network; wherein the reference block is a next block of the target block on the blockchain, and the block header of the reference block comprises a root of a Merkle tree constructed based on the K check blocks corresponding to the target block; and discarding a check block that is of the obtained check blocks of the target block and that does not match the root of the Merkle tree comprised in the block header of the reference block.

7. The method according to claim 1, wherein the consensus network is formed by G consensus nodes, G is a positive integer greater than 1, and K is equal to G; and the storing at least a part of the K check blocks in the consensus node in the consensus network comprises:

determining, from the K check blocks, a matching check block whose arrangement identifier matches an arrangement identifier of a target consensus node in the consensus network; and storing the matching check block in the target consensus node.

8. The method according to claim 1, further comprising:

performing hash calculation on each of the K check blocks to obtain K hash values; and constructing a Merkle tree based on the K hash values, and adding the root of the constructed Merkle tree to a block header of a second block, wherein the second block is a next block of the first block on the blockchain.

9. The method according to claim 1, further comprising:

receiving a block synchronization request transmitted by a target service node, wherein the block synchronization request carries a synchronization block height and a node identifier of the target service node; the target service node is any service node in the witness network; and the synchronization block height is a block height of a target block that needs to be synchronized;

determining a matching block that matches the synchronization block height from the blockchain, and obtaining a block header of the matching block and transaction data that is comprised in the matching block and that can be accessed by the target service node;

obtaining a matching check block of the K check blocks that matches the node identifier; and transmitting the block header of the matching block, the transaction data that is accessible, and the matching check block to the target service node.

10. A data processing method based on a blockchain network, the blockchain network comprising a witness network and a consensus network, the witness network being formed by multiple service nodes, the consensus network being formed by multiple consensus nodes, and the witness network and the consensus network establishing a communication connection, the method comprising:

transmitting a block synchronization request to the consensus node in the consensus network, the block synchronization request carrying a synchronization block height and a node identifier of the target service node, the synchronization block height being a block height of a target block that needs to be synchronized, and the target block being a block on a blockchain maintained by the consensus node in the consensus network, and the block synchronization request requesting the consensus node to return related data of the target block;

receiving the related data of the target block returned by the consensus node, the related data comprising a block header of the target block, transaction data that is comprised in the target block accessible by the target service node, and a matching check block that is of K check blocks corresponding to the target block and that matches the node identifier, K being a positive integer greater than 1; and storing the related data of the target block, the stored matching check block being used by the consensus node in the consensus network to recover the target block, wherein the K check blocks corresponding to the target block are obtained by:

serializing a first block and splitting a serialization result to obtain N data blocks, wherein the first block is a block on the blockchain; and N is a positive integer greater than 1;

forming the N data blocks obtained through splitting into an N*1 data block matrix; and encoding the data block matrix by using a coding matrix to obtain a coding result, wherein the coding result comprises the K check blocks and the N data blocks obtained through splitting;

wherein at least a part of the K check blocks in the consensus node is stored in the consensus network.

11. The method according to claim 10, wherein the method further comprises:

receiving a check block obtaining request about the target block transmitted by a target consensus node in the consensus network, the check block obtaining request being broadcast by the target consensus node to the service node in the witness network when the target consensus node determines that the target block needs to be recovered based on the check block of the target block; and transmitting the stored matching check block corresponding to the target block to the target consensus node, the target consensus node recovering the target block based on the matching check block.

12. The method according to claim 10, wherein the method further comprises:

obtaining a block header of a reference block synchronized from the consensus node in the consensus network, wherein the reference block is a next block of the target block on the blockchain, and the block header of the reference block comprises a root of a Merkle tree constructed based on the K check blocks corresponding to the target block; and if the matching check block in the related data matches the root of the Merkle tree comprised in the block header of the reference block, storing the matching check block.

13. A computer device, comprising: a processor and a memory coupled to the processor, the memory storing executable program code, the processor being configured to call the executable program code to implement:

when determining that a target block needs to be recovered based on a check block of the target block, obtaining the check block of the target block from a service node in a witness network, wherein a blockchain network comprises a witness network and the consensus network, the witness network is formed by multiple service nodes, the consensus network is formed by multiple consensus nodes, and a communication connection is established between the witness network and the consensus network;

determining a data recovery reference matrix based on a coding matrix and the check block of the target block; and recovering the target block based on the data recovery reference matrix and the check block of the target block, wherein:

the target block being a block on a blockchain maintained by the consensus node in the consensus network; the check block of the target block stored by the service node being obtained by the service node when synchronizing related block data of the target block from the consensus node in the consensus network; the check block of the target block being obtained by the consensus node in the consensus network by encoding the target block using the coding matrix; and the check block of the target block being configured for recovering the target block, wherein a check block in the consensus node is obtained by:

serializing a first block and splitting a serialization result to obtain N data blocks, wherein the first block is a block on the blockchain; and N is a positive integer greater than 1;

forming the N data blocks obtained through splitting into an N*1 data block matrix;

encoding the data block matrix by using the coding matrix to obtain a coding result, wherein the coding result comprises the K check blocks and the N data blocks obtained through splitting, and K is a positive integer greater than 1; and storing at least a part of the K check blocks in the consensus node in the consensus network.

14. The computer device according to claim 13, wherein the processor is further configured to implement:

in response to detecting that the target block needs to be recovered, a percentage of abnormal consensus nodes in the consensus network exceeds a set percentage, and the service node in the witness network does not store all block data of the target block, determining that the target block needs to be recovered based on the check block of the target block.

15. The computer device according to claim 13, wherein the determining a data recovery reference matrix based on a coding matrix and the check block obtained from the service node in the witness network; and recovering the target block based on the data recovery reference matrix and the check block obtained from the service node in the witness network comprises:

when the K check blocks of the target block are obtained from the service node in the witness network, obtaining, from the coding matrix, matrix elements corresponding to the K check blocks;

determining the data recovery reference matrix based on the obtained matrix elements corresponding to the K check blocks, and determining an inverse matrix of the data recovery reference matrix; and recovering the target block based on the inverse matrix of the data recovery reference matrix and the K check blocks.

16. The computer device according to claim 13, wherein the determining a data recovery reference matrix based on a coding matrix and the check block obtained from the service node in the witness network; and recovering the target block based on the data recovery reference matrix and the check block obtained from the service node in the witness network comprises:

when X check blocks of the target block are obtained from the service node in the witness network, obtaining the target block from the consensus node in the consensus network, X being a positive integer less than K;

serializing the obtained target block and splitting a serialization result to obtain N data blocks, N being a positive integer greater than 1;

obtaining K-X data blocks from the N data blocks obtained through splitting;

obtaining, from the coding matrix, matrix elements corresponding to the X check blocks and the K-X data blocks, and determining the data recovery reference matrix based on the obtained matrix elements corresponding to the X check blocks and the K-X data blocks; and determining an inverse matrix of the data recovery reference matrix, and recovering the target block based on the inverse matrix, the X check blocks, and the K-X data blocks.

17. The computer device according to claim 16, wherein the processor is further configured to implement:

detecting whether the target block is consistent with the target block obtained from the consensus node in the consensus network, the target block being recovered based on the inverse matrix of the data recovery reference matrix, the X check blocks, and the K-X data blocks; and determining that the target block is recovered successfully if the target blocks are consistent.

18. The computer device according to claim 13, wherein the processor is further configured to implement:

obtaining a block header of a reference block from the service node in the witness network; wherein the reference block is a next block of the target block on the blockchain, and the block header of the reference block comprises a root of a Merkle tree constructed based on the K check blocks corresponding to the target block; and discarding a check block that is of the obtained check blocks of the target block and that does not match the root of the Merkle tree comprised in the block header of the reference block.

19. A non-transitory computer readable storage medium, storing executable program codes, the executable program codes, when executed by one or more processors, causing the one or more processors to implement:

when determining that a target block needs to be recovered based on a check block of the target block, obtaining the check block of the target block from a service node in a witness network, wherein a blockchain network comprises a witness network and the consensus network, the witness network is formed by multiple service nodes, the consensus network is formed by multiple consensus nodes, and a communication connection is established between the witness network and the consensus network;

determining a data recovery reference matrix based on a coding matrix and the check block of the target block; and recovering the target block based on the data recovery reference matrix and the check block of the target block, wherein:

the target block being a block on a blockchain maintained by the consensus node in the consensus network; the check block of the target block stored by the service node being obtained by the service node when synchronizing related block data of the target block from the consensus node in the consensus network; the check block of the target block being obtained by the consensus node in the consensus network by encoding the target block using the coding matrix; and the check block of the target block being configured for recovering the target block, wherein a check block in the consensus node is obtained by:

serializing a first block and splitting a serialization result to obtain N data blocks, wherein the first block is a block on the blockchain; and N is a positive integer greater than 1;

forming the N data blocks obtained through splitting into an N*1 data block matrix;

encoding the data block matrix by using the coding matrix to obtain a coding result, wherein the coding result comprises the K check blocks and the N data blocks obtained through splitting, and K is a positive integer greater than 1; and storing at least a part of the K check blocks in the consensus node in the consensus network.

20. A non-transitory computer readable storage medium, storing executable program codes, the executable program codes, when executed by one or more processors, causing the one or more processors to implement:

transmitting a block synchronization request to a consensus node in a consensus network, the block synchronization request carrying a synchronization block height and a node identifier of the target service node, the synchronization block height being a block height of a target block that needs to be synchronized, and the target block being a block on a blockchain maintained by the consensus node in the consensus network, and the block synchronization request requesting the consensus node to return related data of the target block, wherein a blockchain network comprises a witness network and the consensus network, the witness network is formed by multiple service nodes, the consensus network is formed by multiple consensus nodes, and a communication connection is established between the witness network and the consensus network;

receiving the related data of the target block returned by the consensus node, the related data comprising a block header of the target block, transaction data that is comprised in the target block accessible by the target service node, and a matching check block that is of K check blocks corresponding to the target block and that matches the node identifier, K being a positive integer greater than 1; and storing the related data of the target block, the stored matching check block being used by the consensus node in the consensus network to recover the target block, wherein the K check blocks corresponding to the target block are obtained by:

serializing a first block and splitting a serialization result to obtain N data blocks, wherein the first block is a block on the blockchain; and N is a positive integer greater than 1;

forming the N data blocks obtained through splitting into an N*1 data block matrix; and encoding the data block matrix by using a coding matrix to obtain a coding result, wherein the coding result comprises the K check blocks and the N data blocks obtained through splitting;

wherein at least a part of the K check blocks in the consensus node is stored in the consensus network.

* * * * *